United States Patent
Eames et al.

(10) Patent No.: US 9,529,832 B2
(45) Date of Patent: Dec. 27, 2016

(54) IMAGE MANAGEMENT AND PRESENTATION

(71) Applicant: The Boeing Company, Chicago, IL (US)

(72) Inventors: Patrick Jan Eames, Newcastle, WA (US); Brent Louis Hadley, Kent, WA (US); Stephen Paul Miller, Bellevue, WA (US); Joseph Frank Floyd, University Place, WA (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 14/292,830

(22) Filed: May 31, 2014

(65) Prior Publication Data

US 2014/0279982 A1    Sep. 18, 2014

Related U.S. Application Data

(63) Continuation of application No. 13/072,217, filed on Mar. 25, 2011.

(60) Provisional application No. 61/436,585, filed on Jan. 26, 2011.

(51) Int. Cl.
*G06F 17/30* (2006.01)
*H04N 1/387* (2006.01)
*H04N 1/393* (2006.01)

(52) U.S. Cl.
CPC ...... *G06F 17/30309* (2013.01); *H04N 1/3872* (2013.01); *H04N 1/3935* (2013.01)

(58) Field of Classification Search
None
See application file for complete search history.

(56) References Cited

U.S. PATENT DOCUMENTS

| | | | |
|---|---|---|---|
| 5,341,466 A | 8/1994 | Perlin et al. | |
| 6,121,970 A * | 9/2000 | Guedalia | G06F 3/14 715/234 |
| 6,606,731 B1 | 8/2003 | Baum et al. | |

(Continued)

FOREIGN PATENT DOCUMENTS

| | | |
|---|---|---|
| EP | 1351164 A2 | 8/2003 |
| JP | 2003303091 A | 10/2003 |

(Continued)

OTHER PUBLICATIONS

Chen, Jun-Cheng, et al. "Tiling slideshow." Proceedings of the 14th annual ACM international conference on Multimedia. ACM, 2006.*

(Continued)

*Primary Examiner* — Sultana M Zalalee
(74) *Attorney, Agent, or Firm* — Yee & Associates, P.C.

(57) ABSTRACT

A method and apparatus for managing a number of images. A plurality of resolutions in which the number of images are to be stored and a style of presentation for the number of images is identified using a policy. A plurality of copies of the number of images in the plurality of resolutions are stored. A copy of a particular image in the number of images for a selected location in a layout defining a presentation for the number of images is selected using the style of presentation. The copy of the particular image has a desired resolution in the plurality of resolutions for the selected location in the layout.

39 Claims, 13 Drawing Sheets

(56) References Cited

U.S. PATENT DOCUMENTS

| | | | |
|---|---|---|---|
| 6,650,998 | B1 | 11/2003 | Rutledge et al. |
| 6,684,087 | B1 | 1/2004 | Yu et al. |
| 6,704,024 | B2 | 3/2004 | Robotham et al. |
| 7,069,261 | B2 | 6/2006 | Ahl et al. |
| 7,167,603 | B2 | 1/2007 | Fukuda |
| 8,001,476 | B2 | 8/2011 | Gallo |
| 2002/0154175 | A1 | 10/2002 | Abello et al. |
| 2003/0025734 | A1* | 2/2003 | Boose .............. G06T 11/60 715/765 |
| 2003/0187823 | A1 | 10/2003 | Ahl et al. |
| 2004/0028294 | A1 | 2/2004 | Fukuda |
| 2004/0268221 | A1 | 12/2004 | Wang |
| 2005/0283740 | A1 | 12/2005 | Cleeves et al. |
| 2006/0161863 | A1 | 7/2006 | Gallo |
| 2008/0074423 | A1 | 3/2008 | Gan et al. |
| 2009/0266666 | A1 | 10/2009 | McDaniel |
| 2009/0317010 | A1 | 12/2009 | Gerhard et al. |
| 2010/0229115 | A1* | 9/2010 | Augustine ......... G06F 3/1454 715/800 |
| 2010/0232704 | A1* | 9/2010 | Thorn ............. G06F 3/04845 382/195 |
| 2010/0306696 | A1 | 12/2010 | Groth et al. |
| 2011/0252365 | A1 | 10/2011 | Chiu et al. |
| 2012/0188248 | A1 | 7/2012 | Eames et al. |

FOREIGN PATENT DOCUMENTS

| | | |
|---|---|---|
| JP | 2011114401 A | 6/2011 |
| WO | WO03054708 A1 | 3/2003 |

OTHER PUBLICATIONS

Kasik, David J. "Strategies for consistent image partitioning." MultiMedia, IEEE 11.1 (2004): 32-41.*

Jul. 2015 Update Appendix 1: Examples as Interim Guidance on Subject Matter Eligibility (2014 IEG), 2015, USPTO.*

Australian Government Patent Examination Report No. 1, dated Jan. 13, 2016, regarding Application No. 2012200152, 3 pages.

Canadian Intellectual Property Office Office Action, dated Dec. 30, 2015, regarding Application No. 2,856,528, 4 pages.

Canadian Intellectual Property Office Office Action, dated Nov. 27, 2015, regarding Application No. 2,763,229, 4 pages.

Notices of Reasons for Rejection and English Translation, issued Feb. 9, 2016, regarding Japanese Patent Application No. 2012-013780, 6 pages.

Notice of Reasons for Rejection and English Translation, issued Sep. 29, 2015, regarding Japanese Patent Application No. 2012-013780, 5 pages.

Extended European Search Report, dated May 25, 2012, regarding Application No. EP12152591.9, 13 pages.

"Hard Rock Memorabilia," Hard Rock Café International, Inc., copyright 2009, 1 page. Retrieved Mar. 25, 2011, http://memorabilia.hardrock.com.

Bergman, "GigaPan: President Obama's Inaugural Address," Jan. 21, 2009, 10 pages. Retrieved Oct. 11, 2013, http://gigapan.com/gigapans/15374/.

Office Action, dated Oct. 22, 2013, regarding U.S. Appl. No. 13/072,217, 48 pages.

Final Office Action, dated Jan. 27, 2014, regarding U.S. Appl. No. 13/072,217, 34 pages.

Canadian Intellectual Property Office Office Action, dated Jan. 30, 2014, regarding Application No. 2,763,229, 3 pages.

European Patent Office Communication, dated May 4, 2015, regarding Application No. EP12152591.9, 14 pages.

"Guideline for Noting Digital Camera Specifications in Catalogs," Cameral & Imaging Products Association, CIPA DCG-001-Translation-2005, Oct. 2005, 22 pages.

State Intellectual Property Office of China First Notification of Office Action and English translation, regarding Application No. 201210017779.9, issued Mar. 3, 2016, 19 pages.

* cited by examiner

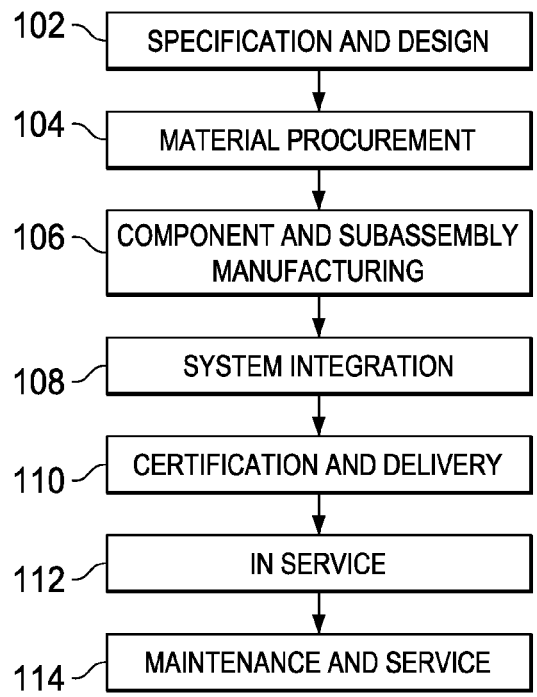
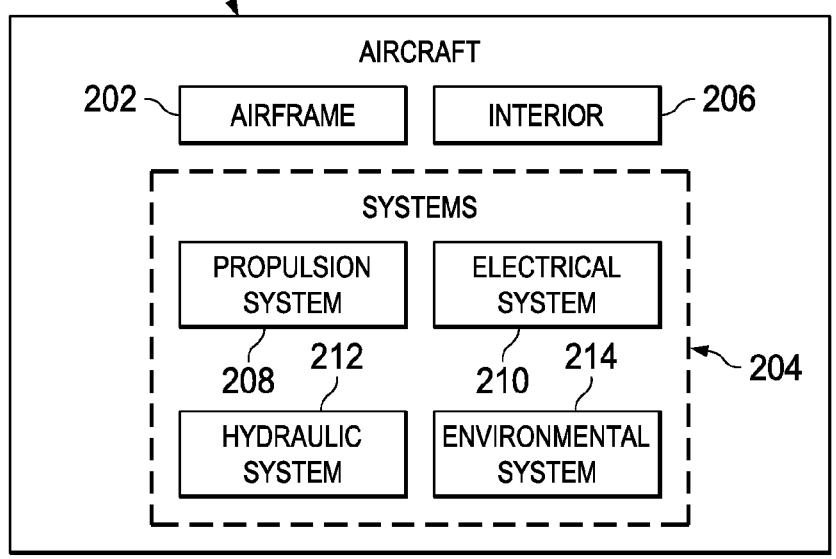

IMAGE MANAGEMENT AND PRESENTATION

RELATED APPLICATIONS

This application is a continuation application of U.S. application Ser. No. 13/072,217, entitled "Image Management and Presentation," filed Mar. 25, 2011. U.S. application Ser. No. 13/072,217 is related to and claims the benefit of priority of provisional U.S. Patent Application Ser. No. 61/436,585, filed Jan. 26, 2011, entitled "Navigation to Aircraft Maintenance Information Using Tiled 2D Illustrations", both of which are incorporated herein by reference.

BACKGROUND INFORMATION

1. Field

The present disclosure relates generally to an improved data processing system and, in particular, to displaying images in a data processing system. Still more particularly, the present disclosure relates to a method, apparatus, and computer program product for managing the display of a number of images for an object.

2. Background

Information printed about a topic is often printed on multiple pages because the information does not fit on a single page and/or is more effectively presented using multiple pages. The multiple pages may be in the same source or in multiple sources. For example, technical drawings of an aircraft may be printed such that different portions of the same diagram may be printed on different pages. Drawings of one assembly on the aircraft may be contained in one library or source, while drawings of another assembly may be contained in a second library or source.

Printed information may also be printed such that one document contains one level of detail about an object, while a second document contains a second level of detail about the same object. For example, a diagram of an aircraft may be printed such that the exterior of the aircraft is visible in the diagram. Another diagram of the same aircraft may be printed such that the exterior of the aircraft is obscured, but the interior of the aircraft is presented. Thus, a reader may use different diagrams to learn different information about the same object.

As another example, wiring diagrams of wiring systems are often printed across multiple pages because the graphical and textual information presented in the wiring diagram is too great to fit on a single page. Thus, a reader may change documents multiple times to learn information about an entire wiring system.

Documents such as engineering diagrams, technical drawings, wiring diagrams, and other suitable document types may be used in the maintenance of an aircraft. The documents are created to be viewed in printed form. However, such documents are commonly stored in electronic form and viewed on a display device of a data processing system. As a result, the reader looks through different documents that may be on different types of media. This type of review may be more time-consuming than desired to find information about an aircraft.

Therefore, it would be advantageous to have a method and apparatus that takes into account at least some of the issues discussed above, as well as possibly other issues.

SUMMARY

In one advantageous embodiment, a method for managing a number of image tiles is provided. A plurality of resolutions in which the number of image tiles is to be stored and a style of presentation for the number of image tiles is identified using a policy. A plurality of copies of the number of image tiles in the plurality of resolutions are stored. A copy of a particular image tile in the number of image tiles for a selected location in a layout defining a presentation for the number of image tiles is selected using the style of presentation. The copy of the particular image tile has a desired resolution in the plurality of resolutions for the selected location in the layout.

In another advantageous embodiment, a method for presenting a layout of a number of image tiles is provided. The layout of the number of image tiles comprising an identifier for a copy of a particular image tile in the number of image tiles having a desired resolution, a selected location at which to present the copy of the particular image tile relative to other image tiles in the number of image tiles, and a size at which to present the copy of the particular image tile relative to copies of the other image tiles in the number of image tiles is received. The copy of the particular image tile having the desired resolution is requested using the identifier. The copy of the particular image tile is presented at the selected location and the size received in the layout.

In yet another advantageous embodiment, a computer program product for managing a number of image tiles includes a computer recordable storage medium and program code stored on the computer recordable storage medium. The program code identifies a plurality of resolutions in which the number of image tiles are to be stored and a style of presentation for the number of image tiles using a policy. The program code also stores a plurality of copies of the number of image tiles in the plurality of resolutions. The program code selects a copy of a particular image tile in the number of image tiles for a selected location in a layout defining a presentation for the number of image tiles using the style of presentation. The copy for the particular image tile has a desired resolution in the plurality of resolutions for the selected location in the layout.

In still yet another advantageous embodiment, a computer program product for presenting a layout of a number of image tiles includes a computer recordable storage medium and program code stored on the computer recordable storage medium. The program code receives the layout of the number of image tiles comprising an identifier for a copy of a particular image tile in the number of image tiles having a desired resolution, a selected location at which to present the copy of the particular image tile relative to other image tiles in the number of image tiles, and a size at which to present the copy of the particular image tile relative to copies of the other image tiles in the number of image tiles. The program code also requests the copy of the particular image tile having the desired resolution using the identifier. The program code presents the copy of the particular image tile at the selected location and the size received in the layout.

In one advantageous embodiment, an apparatus for managing a number of image tiles includes a storage device and a processor unit. The storage device contains program code. The processor unit is configured to execute the program code to identify a plurality of resolutions in which the number of image tiles are to be stored and a style of presentation for the number of image tiles using a policy. The processor unit is further configured to store a plurality of copies of the number of image tiles in the plurality of resolutions. The processor unit selects a copy of a particular image tile in the number of image tiles for a selected location in a layout defining a presentation for the number of image tiles using the style of presentation. The copy for the particular image tile has a desired resolution in the plurality of resolutions for the selected location in the layout.

In another advantageous embodiment, an apparatus for presenting a layout of a number of image tiles includes a storage device and a processor unit. The storage device contains program code. The processor unit is configured to execute the program code to receive the layout of the number of image tiles comprising an identifier for a copy of a particular image tile in the number of image tiles having a desired resolution, a selected location at which to present the copy of the particular image tile relative to other image tiles in the number of image tiles, and a size at which to present the copy of the particular image tile relative to copies of the other image tiles in the number of image tiles. The processor unit is further configured to request the copy of the particular image tile having the desired resolution using the identifier. The program code is configured to present the copy of the particular image tile at the selected location and the size received in the layout.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of an aircraft manufacturing and service method in accordance with an advantageous embodiment;

FIG. 2 is an illustration of an aircraft in which an advantageous embodiment may be implemented;

DETAILED DESCRIPTION

Figure 3:
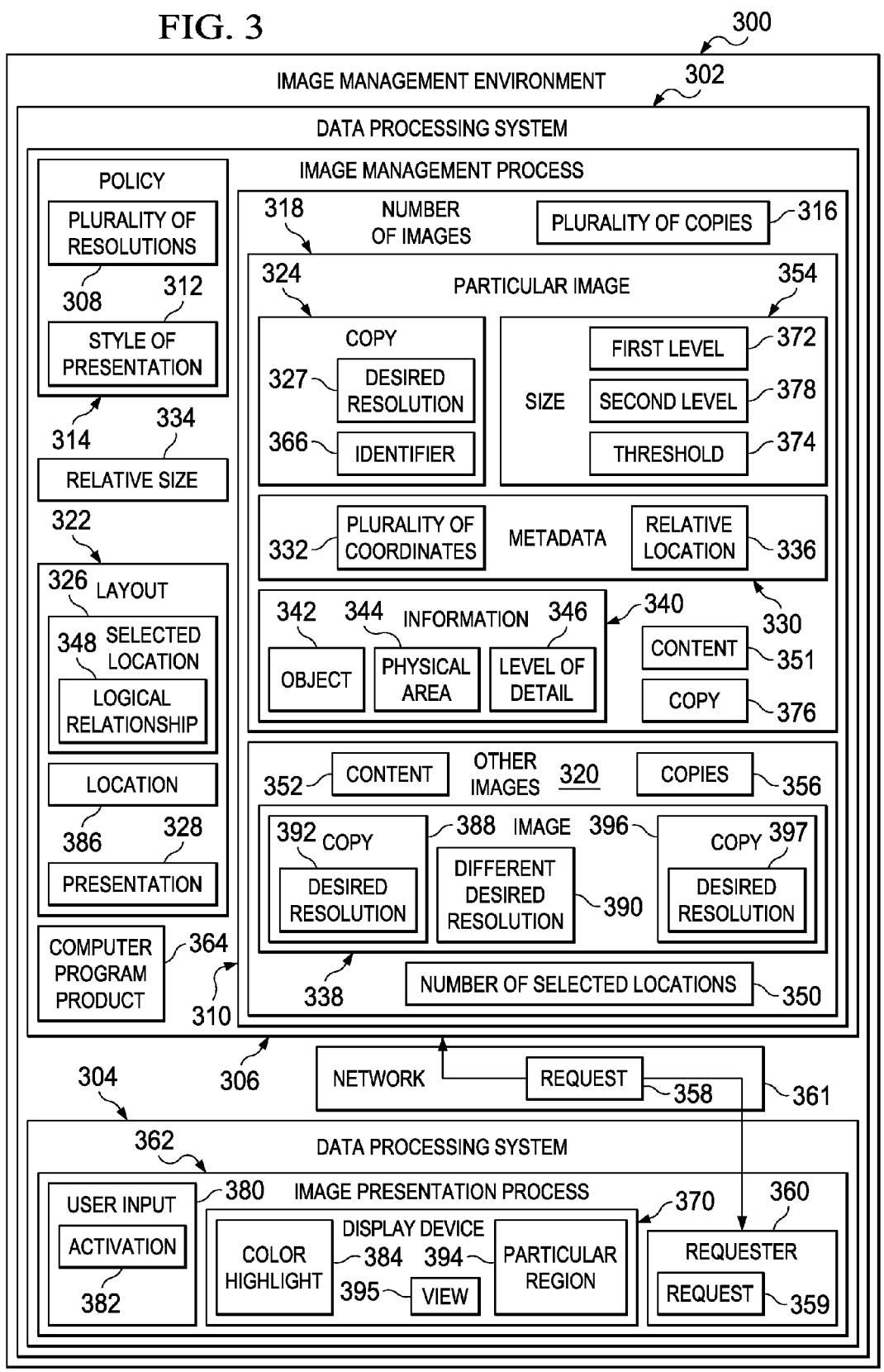
FIG. 3 is an illustration of a block diagram of an image management environment in accordance with an advantageous embodiment.

Referring more particularly to the drawings, advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

While a person is performing routine maintenance and service 114 on aircraft 200, the person may use the different advantageous embodiments to learn information from documents related to routine maintenance and service 114 of aircraft 200. For example, the person may learn how to perform a repair or maintenance operation from multiple documents that are each multiple pages. In one advantageous embodiment, the person uses the documents presented on a display device of a data processing system to locate an inconsistency in the electrical system and rework the electrical system.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of plurality of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A "number", when referring to items, means "one or more items." For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that a reader viewing information contained in multiple electronic pages frequently uses multiple pages to learn the desired information.

For example, a reader desiring to learn the component parts of an aircraft may view many pages containing diagrams of the assemblies and parts that make up the aircraft. Such information is commonly contained in multiple diagrams on multiple pages. One diagram may be an exterior view of an aircraft, while another diagram may contain information about the component parts of an instrument panel. Yet another diagram may contain information about a particular gauge on the instrument panel.

The different advantageous embodiments allow the reader to simultaneously view many or all of the diagrams associated with the aircraft simultaneously. The reader may then enlarge a particular image or group of images in order to locate the desired information.

In the advantageous embodiments, the images are arranged and sized as indicated by a logical relationship between the images. For example, the images may be presented as a hierarchy, where an engineering drawing depicting the exterior of the entire aircraft is located at the top of the hierarchy. Engineering drawings of sections of the aircraft may be located beneath the exterior drawing or in locations that indicate the physical area of the aircraft in which the section is located. Such data may be located, for example, within metadata associated with each image.

In other advantageous embodiments, the reader may not be exactly aware of the page that contains the desired information. For example, a reader who desires to rework a component of an engine may know where the component is located in the engine and the appearance of the component, but does not know the specific drawing in which the reworking information for the part is located. The different advantageous embodiments allow the reader to view many drawings simultaneously at a first resolution. The drawings may be laid out in an arrangement that groups drawings by system in the engine. The reader may then increase the size of the image or group of images that appears to contain the desired information. The images that are increased in size are replaced on the display with copies of the images with a higher resolution than the first resolution.

Thus, the different advantageous embodiments provide a method, an apparatus, and a computer program product for managing a number of images. In one advantageous embodiment, a method for managing a number of images is provided. A plurality of resolutions in which the number of images is to be stored and a style of presentation for the number of images is identified using a policy. A plurality of copies of the number of images in the plurality of resolutions are stored. A copy of a particular image in the number of images for a selected location in a layout defining a presentation for the number of images is selected using the style of presentation. The copy of the particular image has a desired resolution in the plurality of resolutions for the selected location in the layout.

Turning now to FIG. 3, an illustration of a block diagram of an image management environment is depicted in accordance with an advantageous embodiment. Image management environment 300 is an example of an environment in which advantageous embodiments may be implemented.

Image management environment 300 contains data processing system 302 and data processing system 304. Data processing system 302 runs image management process 306. Data processing system 302 may run image management process 306 on a processor unit, such as processor unit 1604 in FIG. 16. Image management process 306 begins by receiving number of images 310. Number of images 310 is a collection of electronic files that may be displayed on a display device. In these illustrative examples, each image in number of images 310 is a document. Number of images 310 may be stored on a storage device, such as storage devices 1615 in FIG. 16. Number of images 310 may be received in a user input as a collection of identifiers for files or folders on the storage device. Of course, number of images 310 may be received in other ways, such as through a computer program.

Image management process 306 identifies plurality of resolutions 308 in which number of images 310 are to be stored. Plurality of resolutions 308 are the amounts of data to be used in storing each of number of images 310. In these illustrative examples, plurality of resolutions 308 are dimensions for number of images 310 in pixels. For example, a resolution of an image in number of images 310 may be about 1,600 pixels wide by about 1,200 pixels high.

Image management process 306 also identifies style of presentation 312 for number of images 310. Style of presentation 312 is an organization for placement and sizing of number of images 310. For example, style of presentation 312 may be at least one of a hierarchy, a grid, or another suitable form. Style of presentation 312 may be stored in a data source, such as a file, a database, or another suitable data type.

Plurality of resolutions 308 and style of presentation 312 may be identified using policy 314. Policy 314 is a number of rules and may include data used to apply the rules. The number of rules relates to the storage and/or presentation of number of images 310. Policy 314 may be located in a file, a database, or another suitable data source that contains one or more rules. In these advantageous embodiments, policy 314 includes style of presentation 312 and plurality of resolutions 308. Of course, in other advantageous embodiments, policy 314 may contain other information. For example, policy 314 may contain security information, network information, and/or other suitable information.

Image management process 306 then stores plurality of copies 316 in plurality of resolutions 308. For example, particular image 318 is an image in number of images 310. A copy of particular image 318 may be stored in each resolution in plurality of resolutions 308. Plurality of copies 316 may be stored on a storage device associated with data processing system 302 or another data processing system using a network.

Once plurality of copies 316 is generated, image management process 306 generates layout 322. Of course, in other advantageous embodiments, layout 322 may be generated prior to plurality of copies 316 being generated. Layout 322 is a collection of position and size information for displaying number of images 310. In other words, layout 322 defines presentation 328 of number of images 310. In an advantageous embodiment, layout 322 is stored in a file, such as an Extensible Markup Language (XML) file. Of course, layout 322 may be stored in another type of file, a database, or another suitable data type.

Image management process 306 generates layout 322 by selecting copy 324 of particular image 318 for selected location 326 in layout 322. Copy 324 is selected for selected location 326 from plurality of copies 316 when copy 324 has desired resolution 327.

Desired resolution 327 is a resolution in plurality of resolutions 308 that matches the size at which particular image 318 will be presented when using layout 322. The size at which particular image 318 will be presented is the dimensions at which the image are to be displayed on a display device. For example, the size may include a width dimension and a height dimension. In one illustrative example, desired resolution 327 is a resolution of about 1,600 pixels wide and about 1,200 pixels high when layout 322 indicates that particular image 318 will be displayed as the largest image in layout 322. Alternatively, desired resolution 327 may be about 640 pixels wide by about 480 pixels high when particular image 318 will be displayed as the smallest image in layout 322.

In some advantageous embodiments, metadata 330 is associated with particular image 318. In such advantageous embodiments, selected location 326 and/or desired resolution 327 are selected using metadata 330. For example, metadata 330 associated with particular image 318 may include plurality of coordinates 332 that identify a location for particular image 318 within layout 322. Metadata 330 may also include other information, such as points to or identification of other images within or outside of layout 322. Metadata 330 also may include information about a number of objects in particular image 318.

In other advantageous embodiments, metadata 330 includes one or more of tags, header information, historical detail of the number of objects, related images and/or objects, and/or other suitable information. Metadata 330 may include identifiers of other images and/or objects that are depicted in particular image 318 using a different level of detail. For example, metadata 330 may include an identifier of an engineering drawing of an aircraft when particular image 318 depicts an engineering diagram of a wing associated with the aircraft.

Plurality of coordinates 332 may be absolute or relative. In other words, plurality of coordinates 332 may be absolute by specifying coordinates in a coordinate system that spans all of layout 322. Alternatively, plurality of coordinates 332 may be relative by specifying coordinates in a coordinate system relative to another image or point in layout 322. In other words, plurality of coordinates 332 may indicate relative location 336 for particular image 318 as compared to image 338 in number of images 310.

In yet other advantageous embodiments, logical relationship 348 exists between selected location 326 for particular image 318 and number of selected locations 350 for other images 320 in number of images 310. Logical relationship 348 is an association between content 351 of particular image 318 and content 352 of other images 320. Content 351 is the subject or object that is being depicted in particular image 318. Likewise, content 352 represents the subjects or objects being depicted in other images 320. Logical relationship 348 is indicated in metadata 330 in some advantageous embodiments.

For example, logical relationship 348 may be that one particular image 318 depicts another view of an object depicted in other images 320. Another example of logical relationship 348 is that particular image 318 depicts a continuation of a diagram depicted in at least one of other images 320. In such advantageous embodiments, image management process 306 uses logical relationship 348 between content 351 and content 352 to choose selected location 326 and size 354 of particular image 318 in layout 322.

In other advantageous embodiments, metadata 330 associated with particular image 318 contains information 340 about object 342 depicted in particular image 318. In these illustrative examples, information 340 includes physical area 344 of object 342 depicted in particular image 318 and/or level of detail 346 of object 342 depicted in particular image 318. Image management process 306 uses information 340 to choose selected location 326.

In still other advantageous embodiments, metadata 330 is absent. In such advantageous embodiments, a user may input particular image 318 for selected location 326. For example, a user may desire to locate an image of an aircraft engine in layout 322 near the wing area of a diagram of the entire aircraft in layout 322.

In yet other advantageous embodiments, selected location 326 of particular image 318 and relative size 334 of particular image 318 are received with style of presentation 312. In such an advantageous embodiment, style of presentation 312 is a data source that contains selected location 326 and relative size 334 for particular image 318.

For example, style of presentation 312 may indicate that a hierarchy is to be presented when layout 322 is presented. In such an illustrative example, style of presentation 312 may indicate that selected location 326 of particular image 318 is to be presented below image 338 and relative size 334 for particular image 318 is to be about one half the size of image 338. Relative size 334 is a measurement for the size of particular image 318 that is calculated using the size of another image, such as image 338. In such advantageous embodiments, desired resolution 327 is selected based on relative size 334 of particular image 318. For example, a first resolution may be desired resolution 327 when relative size 334 in style of presentation 312 is greater than a threshold. A second resolution may be desired resolution 327 when relative size 334 in style of presentation 312 is less than the threshold.

Thus, selected location 326, identifier 366 of copy 324 of particular image 318, and size 354 for particular image 318 are stored in layout 322. Size 354 may be stored as a value relative to the size of copies 356 of other images 320. Copy 324 may be represented in layout 322 using identifier 366.

Identifier 366 may be a file name, a network address, a uniform resource locator (URL), or another suitable identifier.

In this advantageous embodiment, copy 324 is depicted in FIG. 3. However, in other advantageous embodiments, layout 322 includes an identifier for multiple copies of particular image 318 representing different desired resolutions for display at different sizes. For example, copy 376 of particular image 318 is a copy of particular image 318 as is copy 324. However, copy 376 has a higher resolution than copy 324. Thus, layout 322 may include an identifier of copy 324 with a first resolution for display when copy 324 is being displayed in a particular range of sizes. However, layout 322 may also include an identifier of copy 376 of particular image 318 with a second resolution higher than the first resolution. The identifier of copy 376 is used to request the copy when the size of copy 324 increases beyond a threshold. The threshold may be included in layout 322 in some advantageous embodiments.

In these illustrative examples, such identifier information, location information, resolution information, and size information is selected and stored in layout 322 for each image in number of images 310. Of course, in some advantageous embodiments, location, resolution, and/or size information about one or more images in number of images 310 is not selected or stored in layout 322.

Image management process 306 may then receive request 358 for layout 322 from requester 360. Requester 360 is image presentation process 362 running on data processing system 304 in these illustrative examples. Request 358 may be a message received by image management process 306 over network 361. Of course, in other advantageous embodiments, request 358 may be received on flash storage media, optical storage media, or another suitable storage media. Image management process 306 then forms computer program product 364 containing layout 322 and sends computer program product 364 to image presentation process 362.

Image presentation process 362 receives layout 322. Image presentation process 362 uses identifier 366 of copy 324 in layout 322 to request copy 324 from image management process 306 running on data processing system 302. For example, image presentation process 362 may request copy 324 using a uniform resource locator in layout 322.

Image presentation process 362 receives copy 324 and presents copy 324 at selected location 326 and size 354 indicated in layout 322. Image presentation process 362 presents copy 324 by causing display device 370 to display copy 324. Likewise, copies 356 of other images 320 in number of images 310 that are included in layout 322 are requested and displayed. In some illustrative examples, user input 380 is received. User input 380 includes activation 382 of copy 324 being displayed on display device 370. In such an illustrative example, image presentation process 362 presents copy 324 with color highlight 384. Color highlight 384 is an opaque or translucent coloring applied to the image in copy 324 being displayed on display device 370. For example, a yellow highlight may be applied to copy 324 when activated in user input 380.

In another advantageous embodiment, user input 380 includes activation 382, but activation 382 does not cause copy 324 to be displayed with user input 380. Instead, user input 380 includes activation 382 and location 386. Activation 382 is a selection of an image from number of images 310 that is being displayed by display device 370. Location 386 is a new location for copy 324. Image presentation process 362 moves copy 324 to location 386 by ceasing to present copy 324 at selected location 326 and instead presents copy 324 at location 386.

Copies of images in number of images 310 may be presented in different resolutions. For example, assume copy 324 and copy 388 of image 338 are being displayed by display device 370. Copy 324 and copy 388 may be displayed in different desired resolution 390 based on the occurrence of one or more conditions. In other words, copy 324 has desired resolution 327, and copy 388 has desired resolution 392 when certain conditions are true.

For example, assume that copy 324 is being displayed in particular region 394 of display device 370. Further assume that copy 388 is displayed on display device 370 but outside of particular region 394 of display device 370. In this illustrative example, particular region 394 is an area of display device 370 that indicates an area in which the user is focusing attention. For example, particular region 394 may be an area surrounding the center of display device 370. Copy 388 with desired resolution 392 is displayed until copy 388 is moved into particular region 394.

For example, the user may move view 395 such that copy 388 is displayed in particular region 394 of display device 370. Image presentation process 362 then uses layout 322 to identify copy 396 of image 338 that has desired resolution 397. In this illustrative example, desired resolution 397 is a higher resolution than desired resolution 392. Image presentation process 362 then requests copy 396, receives copy 396, and presents copy 396 using display device 370 in place of copy 388. Thus, copy 388 is replaced with a higher resolution copy of image 338 when view 395 is moved such that copy 388 enters particular region 394 of display device 370.

In another advantageous embodiment, request 359 is received to increase size 354 of copy 324 of particular image 318 to first level 372. Request 359 may be received as a user input. For example, the user of data processing system 304 may desire to increase the size of copy 324 to view additional detail. In such an advantageous embodiment, image presentation process 362 determines whether first level 372 exceeds threshold 374. Threshold 374 is a value for size 354 at which desired resolution 327 changes. Threshold 374 is included in layout 322 in some advantageous embodiments. When size 354 exceeds threshold 374, image presentation process 362 requests copy 376 of particular image 318. Copy 376 is indicated in layout 322 as having a higher resolution than copy 324.

Image presentation process 362 causes copy 376 to be displayed on display device 370 in place of copy 324. In some advantageous embodiments, an animation effect is applied to copy 324 to result in displaying copy 376. Likewise, request 359 is received to decrease size 354 of copy 324 to second level 378. When second level 378 is below threshold 374, copy 324 is presented in place of copy 376 on display device 370.

The illustration of image management environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, data processing system 304 and data processing system 302 are the same data processing system. In other words, image presentation process 362 and image management process 306 run on the same data processing system. Thus, layout 322 is generated, and number of images 310 are presented on display device 370 using a single data processing system. Of course, in other advantageous embodiments, some functions of image management process 306 and image presentation process 362 may each be performed on multiple data processing systems. For example, layout 322 may be generated for multiple sets of images simultaneously on different data processing systems.

Figure 4:
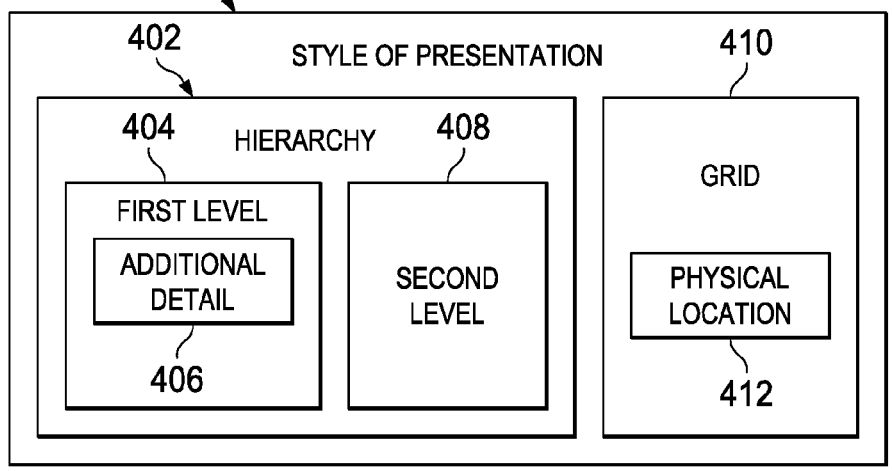
FIG. 4 is an illustration of a block diagram of a style of presentation in accordance with an advantageous embodiment.

With reference now to FIG. 4, an illustration of a block diagram of a style of presentation is depicted in accordance with an advantageous embodiment. Style of presentation 400 is an example implementation of style of presentation 312 in FIG. 3.

Style of presentation 400 is in the form of hierarchy 402 in some advantageous embodiments. Hierarchy 402 is an ordered ranking of images, such as number of images 310 in FIG. 3. In these illustrative examples, a particular image, such as particular image 318 in FIG. 3, may be presented on first level 404. The particular image depicts additional detail 406 about the contents of a second image, such as image 338 in FIG. 3. Thus, the second image is on second level 408. Second level 408 is higher in the hierarchy than first level 404. The second image is presented on second level 408 because the particular image on first level 404 presents additional detail 406 about the second image on second level 408.

In other advantageous embodiments, style of presentation 400 is grid 410. Grid 410 is a collection of horizontally- and/or vertically-arranged images. In these illustrative examples, grid 410 presents images in an order such that images that represent the same or similar physical location 412 of an object, such as object 342 in FIG. 3, are located adjacent to one another when stored in a layout, such as layout 322.

Figure 5:
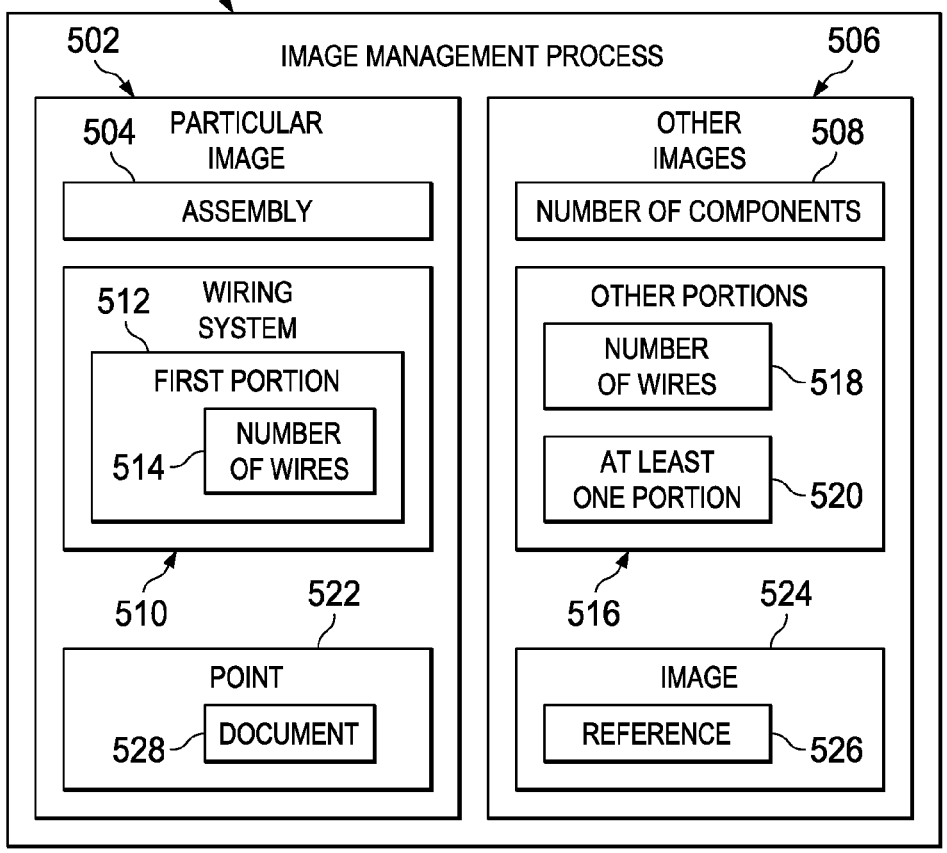
FIG. 5 is an illustration of a block diagram of an image management process in accordance with an advantageous embodiment.

Turning now to FIG. 5, an illustration of a block diagram of an image management process is depicted in accordance with an advantageous embodiment. Image management process 500 is an example implementation of image management process 306 in FIG. 3.

Particular image 502 is an example of particular image 318 in FIG. 3. In some advantageous embodiments, particular image 502 depicts assembly 504. Assembly 504 is a mechanism that includes more than one part. In these illustrative examples, other images 506 depict number of components 508 of assembly 504. Other images 506 are examples of other images 320 in FIG. 3. Number of components 508 is the component parts of assembly 504. For example, particular image 502 may depict an instrument panel, and other images 506 may depict a number of instruments, brackets, and electrical connections.

In another advantageous embodiment, a number of images, such as number of images 310 in FIG. 3, depicts wiring system 510. Wiring system 510 is a diagram that depicts information about conductors for a particular purpose. The diagram may include wire routing, connectors, colorings, and other suitable information. In this advantageous embodiment, particular image 502 depicts first portion 512 of wiring system 510. First portion 512 contains information about number of wires 514. Other images 506 depict information about other portions 516 of wiring system 510. In this illustrative example, other portions 516 contain number of wires 518. Number of wires 518 is depicted as connecting to number of wires 514, but the information about number of wires 518 and number of wires 514 is stored in different images. In other words, number of wires 514 depicted in particular image 502 connects to number of wires 518 depicted in at least one portion 520 in other portions 516.

In yet another advantageous embodiment, the selected location, such as selected location 326 in FIG. 3, for particular image 502 is point 522. Point 522 represents a location in image 524 where reference 526 is located. Reference 526 is a textual or graphic association with a document. For example, in an advantageous embodiment in which a number of images depicts a legal brief, reference 526 is a footnote referring to a supporting document, such as a court opinion. Thus, particular image 502 is document 528 referred to by reference 526 in image 524.

Figure 6:
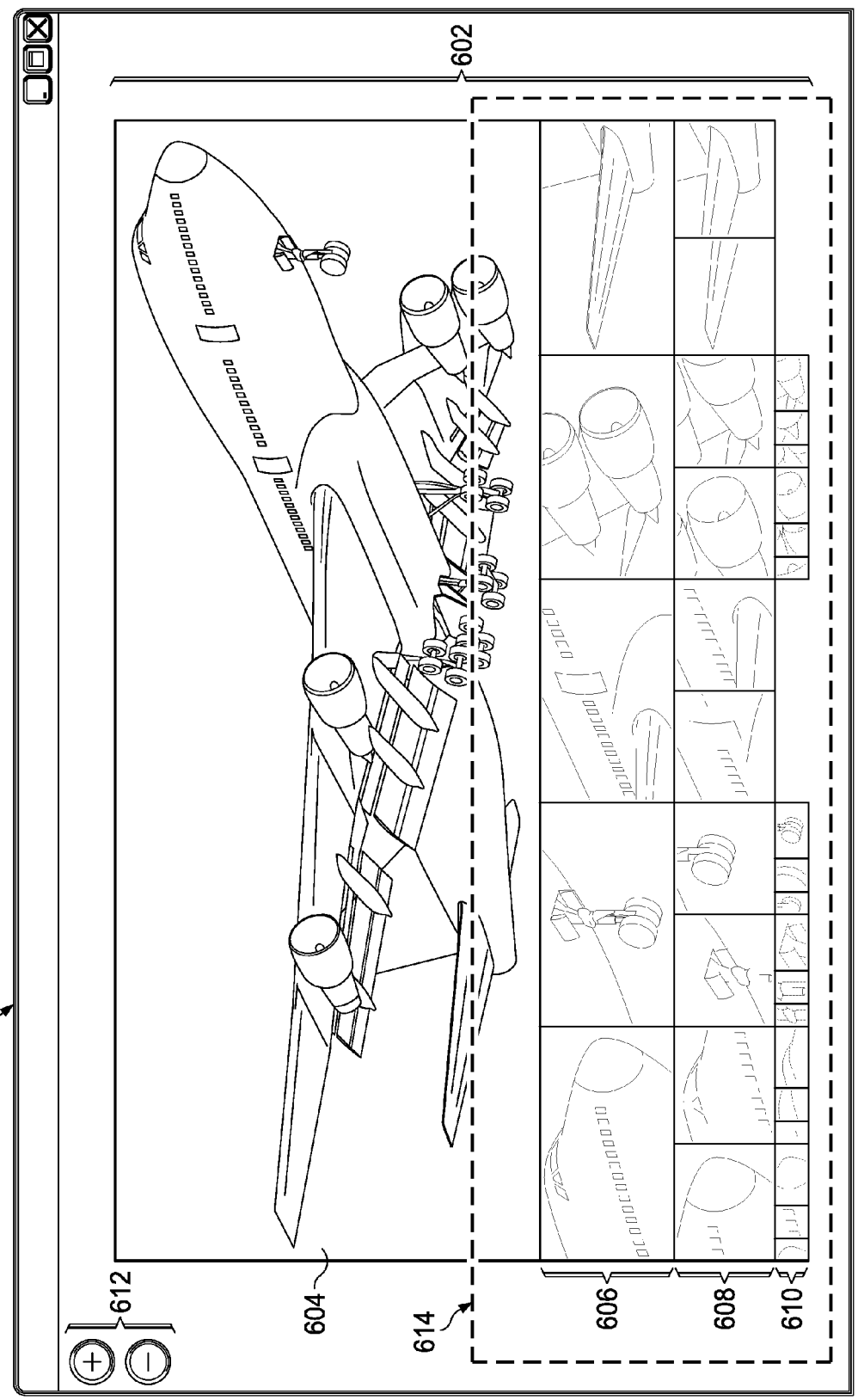
FIG. 6 is an illustration of a screenshot of a first view in accordance with an advantageous embodiment.
Figure 7:
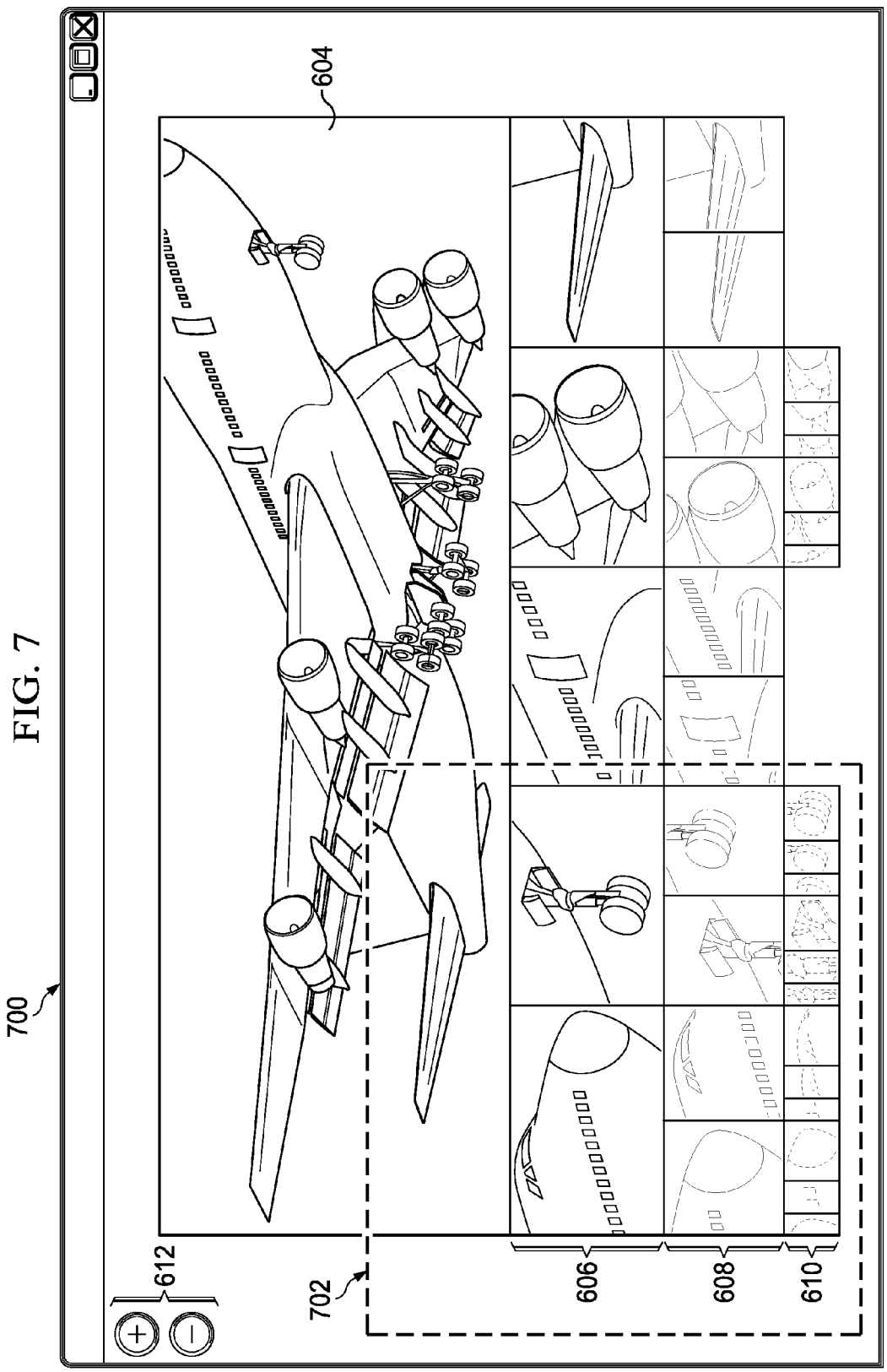
FIG. 7 is an illustration of a screenshot of a second view in accordance with an advantageous embodiment.
Figure 8:
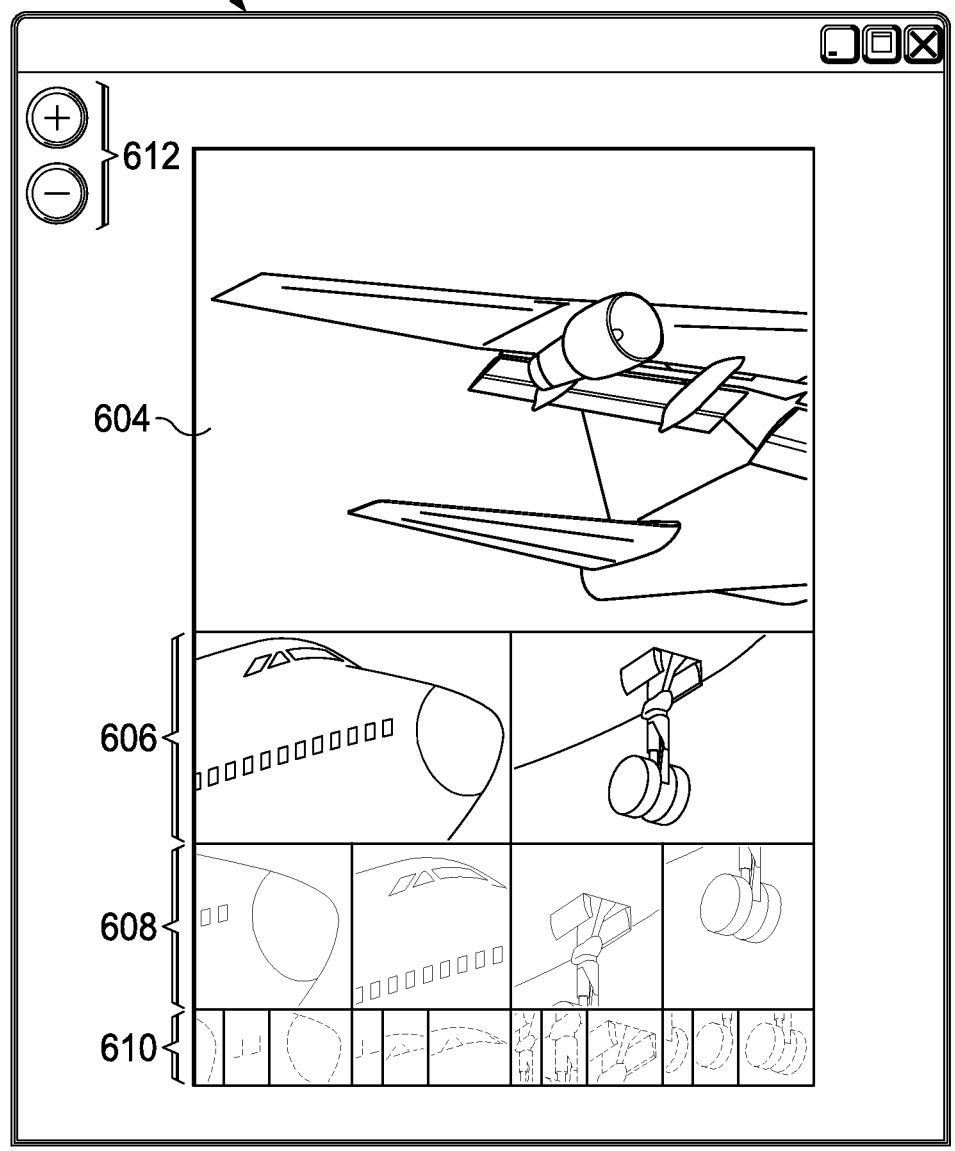
FIG. 8 is an illustration of a screenshot of a third view in accordance with an advantageous embodiment.

FIGS. 6-8 depict example images displayed when a user interacts with a view in which a layout is presented. In these examples, the view may be view 395 in FIG. 3.

With reference now to FIG. 6, an illustration of a screenshot of a first view is depicted in accordance with an advantageous embodiment. View 600 is an example implementation of view 395. In these illustrative examples, view 600 is displayed on a display device, such as display device 370 in FIG. 3.

View 600 includes images 602. Images 602 are copies of a number of images, such as number of images 310 in FIG. 3. The copies in images 602 have different resolutions, based on the location in which they are presented. Images 606 have a lower resolution than image 604.

In this advantageous embodiment, images 602 depicts engineering drawings of an aircraft. The images have a logical relationship, such as logical relationship 348 in FIG. 3. Such a logical relationship may be identified using metadata associated with the images. The logical relationship, in this illustrative example, is that the images presented on a level depict additional detail regarding the content of the image on the level above.

View 600 is an example of a view generated when the style of presentation is a hierarchy. For example, image 604 is on a higher level in the hierarchy than images 606 because images 606 depict additional detail about the contents of image 604.

For example, image 604 depicts an exterior view of the entire aircraft. Images 606 depict a nose section, a landing gear assembly, a window, an engine assembly, and a tail assembly. Images 606 depict additional detail about the content than image 604.

Images 608 may depict additional detail regarding the content of images 606. Images 610 may depict even further detail. However, in view 600, images 608 and images 610 are presented at a resolution that causes the contents of the images to be only partially understood or not understood at all by a reader. Of course, in other advantageous embodiments, images 608 and/or images 610 may be presented at a sufficient resolution to interpret substantially all of the information presented.

In this illustrative example, a user activates controls 612 to move and/or increase the size of the images in view 600 such that view 600 includes only area 614. In other words, the user activates controls 612 to move and/or zoom view 600 to include area 614.

Looking now to FIG. 7, an illustration of a screenshot of a second view is depicted in accordance with an advantageous embodiment. View 700 is the result of the user using controls 612 to modify view 600 in FIG. 6 to include area 614.

Once the user activates controls 612 to form view 700, the size of image 604, images 606, images 608, and images 610 have been increased. Assume the size of images 606 and images 608 have exceeded a threshold, such as threshold 374 in FIG. 3. Thus, copies of images 606 and images 608 having higher resolutions than presented in FIG. 6 are requested, received, and presented in place of the images from view 600 in FIG. 6.

The resolution of the copies allows the user to interpret substantially all of the information presented. However, view 700 does not present images 610 with sufficient resolution to be interpreted by the user, because the size of images 610 has not been increased to a level that exceeds the threshold. In this illustrative example, the user activates controls 612 again to move and/or resize the view to area 702.

With reference to FIG. 8, an illustration of a screenshot of a third view is depicted in accordance with an advantageous embodiment. View 800 is the result of the user using controls 612 to modify view 700 to include area 702 in FIG. 7.

Once the user activates the controls to form view 800, the size of image 604, images 606, images 608, and images 610 have been increased. The size of images 610 have now been increased beyond the threshold. Thus, additional copies of images 610 have been requested, received, and presented in place of the copies in FIG. 7. The contents and information in images 610 are now sufficient to be interpreted by the user. In this advantageous embodiment, only the copies in images 610 that are contained within view 800 are requested. Thus, copies in images not contained in view 800 are not requested in this advantageous embodiment.

Figure 9:
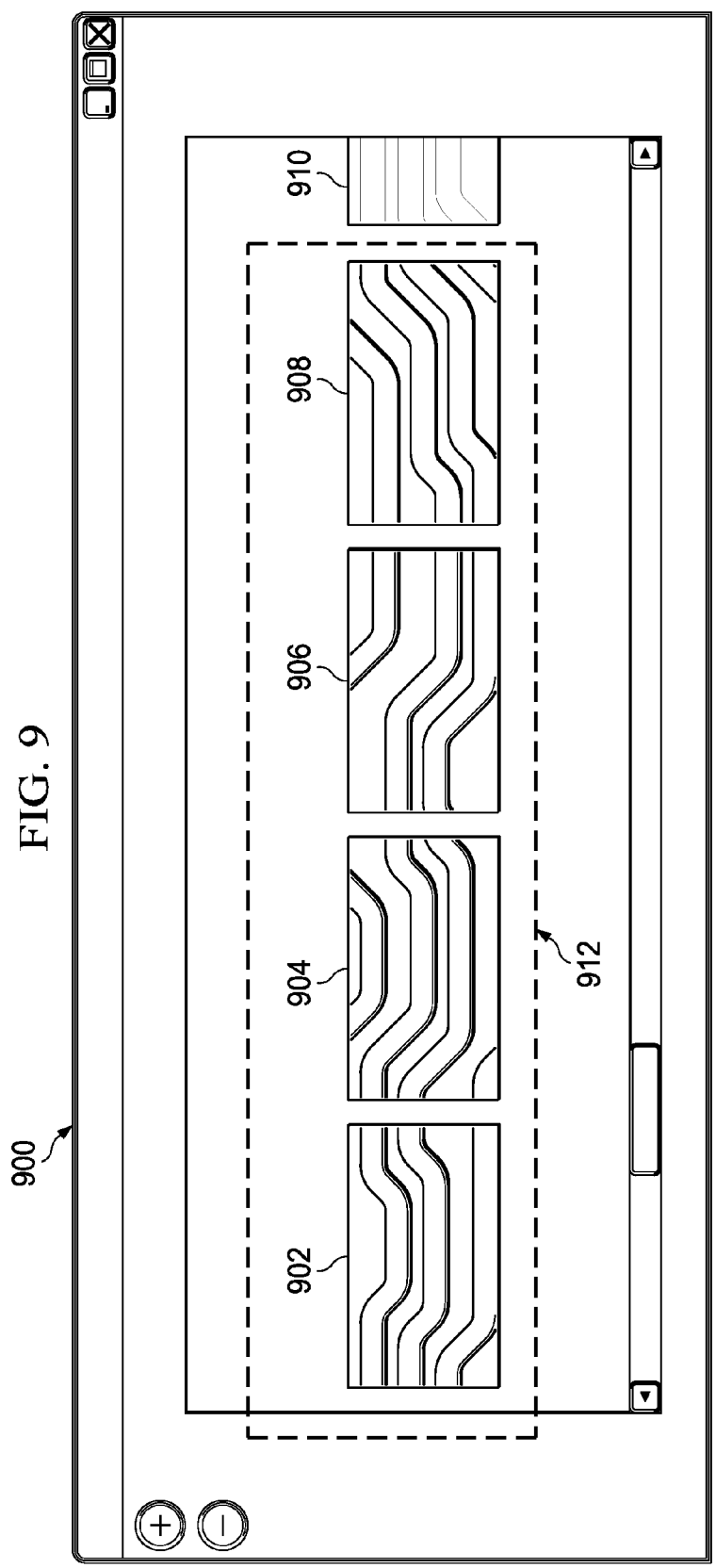
FIG. 9 is an illustration of a screenshot of a view containing a wiring diagram in accordance with an advantageous embodiment.

Turning now to FIG. 9, an illustration of a screenshot of a view containing a wiring diagram is depicted in accordance with an advantageous embodiment. View 900 is an example implementation of view 395 in FIG. 3.

View 900 includes images 902, 904, 906, 908, and 910. Images 902, 904, 906, 908, and 910 depict a wiring diagram of a wiring system that is printed with a different portion of the wiring system depicted on each of the pages. Images 902, 904, 906, 908, and 910 have a logical relationship such that the wires depicted in image 902 connect to the wires depicted in image 904. At least one wire depicted in image 904 connects to at least one wire in image 906. At least one wire depicted in image 906 connects to at least one wire in image 908. Likewise, at least one wire depicted in image 908 connects to at least one wire in image 910.

Particular region 912 is an example implementation of particular region 394 in FIG. 3. Image 910 is located in view 900 but outside particular region 912 of view 900. Thus, image 910 is presented as a copy with a lower resolution than the resolution of the copies presented for images 902, 904, 906, and 908.

Figure 10:
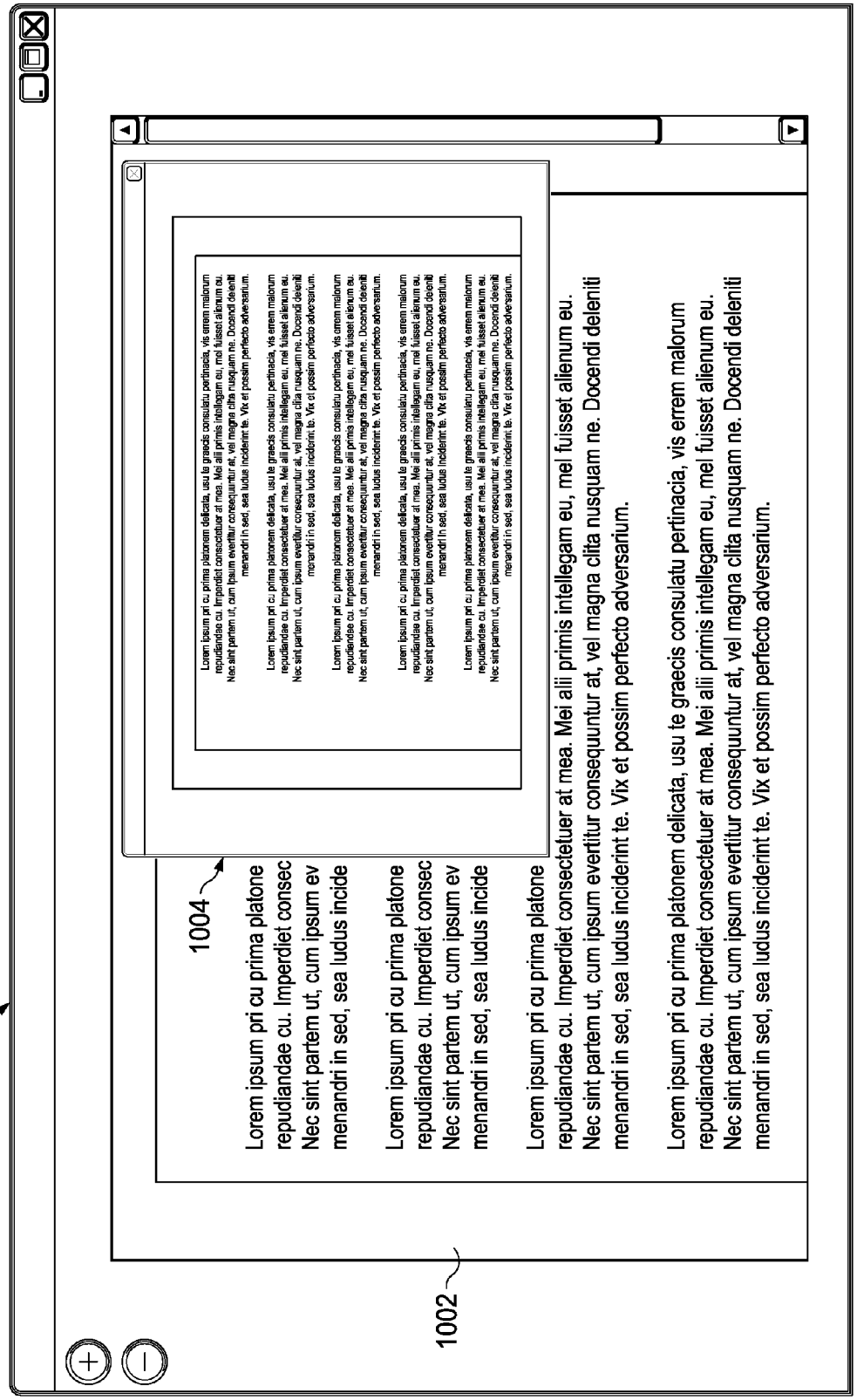
FIG. 10 is an illustration of a screenshot of a view containing a document in accordance with an advantageous embodiment.

With reference to FIG. 10, an illustration of a screenshot of a view containing a document is depicted in accordance with an advantageous embodiment. View 1000 is an example implementation of view 395 in FIG. 3.

View 1000 includes image 1002 and image 1004. Image 1002 is a document that contains a reference, such as reference 526 in FIG. 5, to the document depicted in image 1004. Thus, image 1004 is presented at the location at which the reference in image 1002 is located. Because the size of image 1004 in view 1000 is smaller than a threshold, the resolution of image 1004 is lower than the resolution of image 1002.

Figure 11:
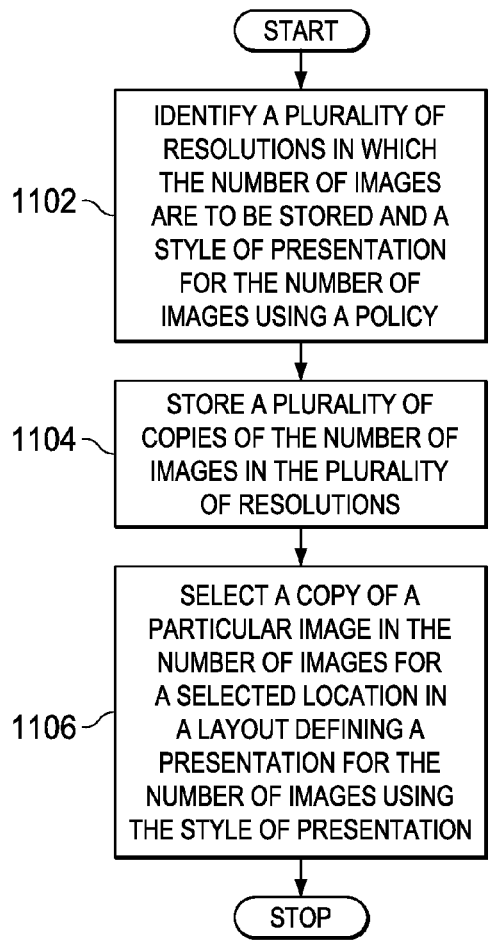
FIG. 11 is an illustration of a flowchart of a process for managing a number of images in accordance with an advantageous embodiment.

Looking now to FIG. 11, an illustration of a flowchart of a process for managing a number of images is depicted in accordance with an advantageous embodiment. The process may be performed by image management process 306 running in data processing system 302 in FIG. 3.

The process begins by identifying a plurality of resolutions in which the number of images are to be stored and a style of presentation for the number of images using a policy (operation 1102). The policy may be stored in a file, a database, or another suitable data source. The plurality of resolutions are the amounts of data to be contained in each image. For example, a resolution may be represented as 1,600 pixels wide by 1,200 pixels high.

The process then stores a plurality of copies of the number of images in the plurality of resolutions (operation 1104). The plurality of copies may be stored in a directory structure, a database, or another suitable data structure. The process then selects a copy of a particular image in the number of images for a selected location in a layout defining a presentation for the number of images using the style of presentation (operation 1106). The process terminates thereafter.

The process may select the copy for the selected location based on metadata associated with the images. The images may have a logical relationship that indicates the presentation. The copy for the particular image has a desired resolution in the plurality of resolutions for the selected location in the layout.

Figure 12:
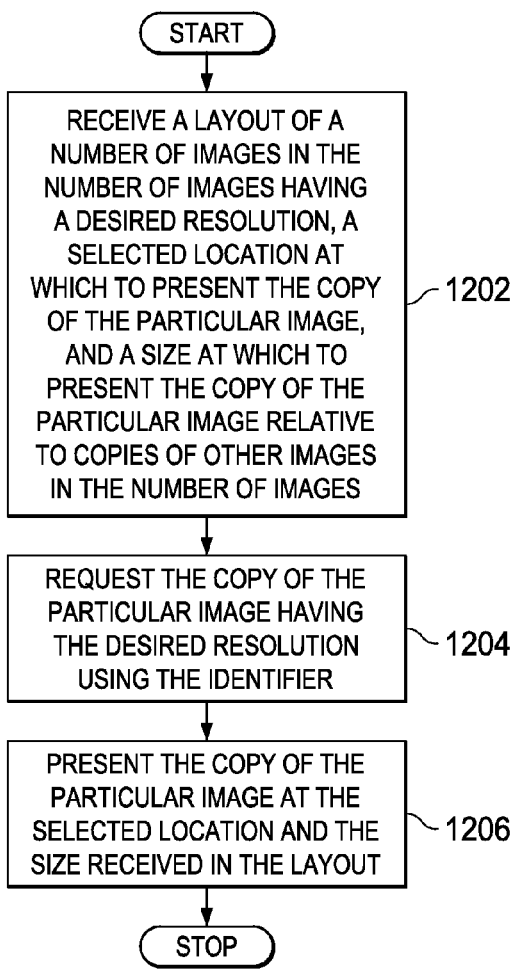
FIG. 12 is an illustration of a flowchart of a process for presenting a number of images in accordance with an advantageous embodiment.

Turning now to FIG. 12, an illustration of a flowchart of a process for presenting a number of images is depicted in accordance with an advantageous embodiment. The process may be performed by image presentation process 362 in data processing system 304 in FIG. 3.

The process receives a layout of a number of images, including an identifier for a copy of a particular image, in the number of images having a desired resolution, a selected location at which to present the copy of the particular image relative to other images in the number of images, and a size at which to present the copy of the particular image relative to copies of the other images in the number of images (operation 1202). The layout may be received from an image management process, such as image management process 306 in FIG. 3. The size may be presented using coordinates and/or a size relative to the other images.

The process then requests the copy of the particular image having the desired resolution using the identifier (operation 1204). The process may request the copy using a network or communication within a single data processing system. Alternatively, the process may store a request on a computer readable storage medium for later processing. The process then presents the copy of the particular image at the selected location and the size received in the layout (operation 1206). The process terminates thereafter.

Figure 13:
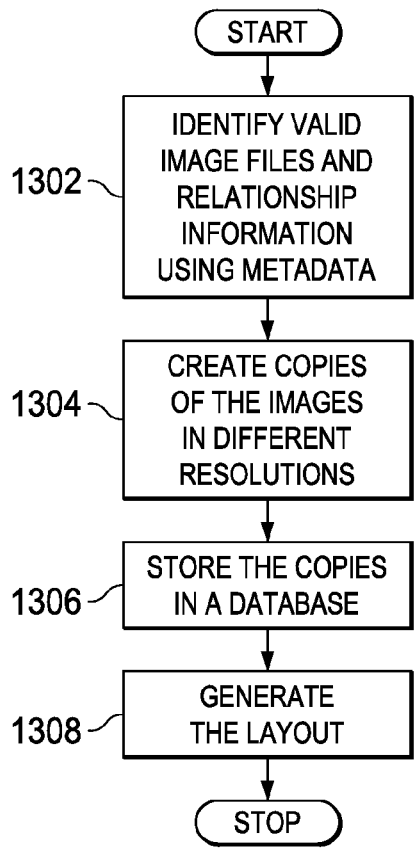
FIG. 13 is an illustration of a flowchart of a process for generating a layout in accordance with an advantageous embodiment.

Looking now to FIG. 13, an illustration of a flowchart of a process for generating a layout is depicted in accordance with an advantageous embodiment. The process may be performed by image management process 306 running on data processing system 302 in FIG. 3.

The process begins by identifying valid image files and relationship information using metadata (operation 1302). The process may identify valid image files using file extensions, header information, and/or checksum values. The relationship information may include a logical relationship among the images. For example, some images may provide additional detail about the contents of other images.

The process then creates copies of the images in different resolutions (operation 1304). The resolutions may be included in a policy or rule. The resolution may also be specified for only one dimension. In other words, the resolution may be specified only for height or width in some advantageous embodiments. The process stores the copies in a database (operation 1306).

Finally, the process generates the layout (operation 1308). The process terminates thereafter. The layout includes the position and size information for the images based on the logical relationship among the images. A policy may also be used to indicate what layout is to be used when a particular logical relationship is encountered.

Figure 14:
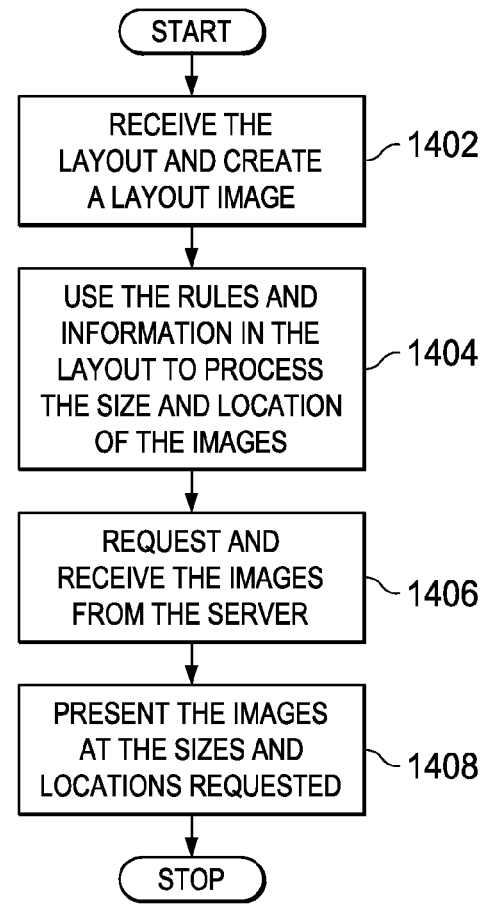
FIG. 14 is an illustration of a flowchart of a process for displaying images in accordance with an advantageous embodiment.

With reference now to FIG. 14, an illustration of a flowchart of a process for displaying images is depicted in accordance with an advantageous embodiment. The process may be performed by image presentation process 362 running on data processing system 304 in FIG. 3.

The process begins by receiving the layout and creating a layout image (operation 1402). The process may receive the layout from an image management process, such as image management process 306 in FIG. 3. The layout image may be an empty image or environment that is to be filled with the images.

The process then uses the rules and information in the layout to process the size and location of the images (operation 1404). The process may use coordinates and/or relative locations and sizes to identify an arrangement for the images. The process then requests and receives the images from the server (operation 1406). The requested images have the resolution specified in the layout for the size at which the images will be displayed. The process then presents the images at the sizes and locations requested (operation 1408). The process terminates thereafter.

Figure 15:
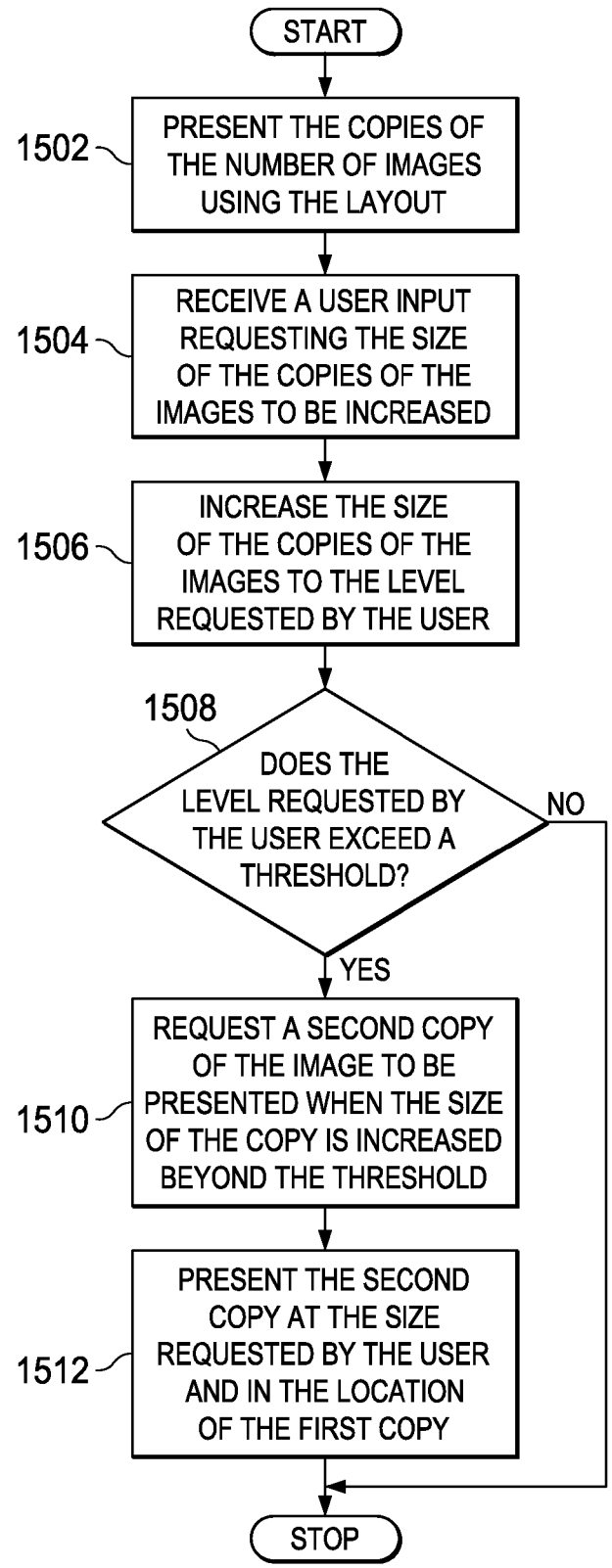
FIG. 15 is an illustration of a flowchart of a process for managing a user input in accordance with an advantageous embodiment.

Turning now to FIG. 15, an illustration of a flowchart of a process for managing user input is depicted in accordance with an advantageous embodiment. The process may be performed by image presentation process 362 running on data processing system 304 in FIG. 3.

The process begins by presenting the copies of the number of images using the layout (operation 1502). Operation 1502 is performed using the process in FIG. 14 in this illustrative example. The process then receives a user input requesting the size of the copies of the images to be increased (operation 1504).

The process then increases the size of the copies of the images to the level requested by the user (operation 1506). The size of the copies is increased on the display device displaying the copies of the images. The process then determines whether the level requested by the user exceeds a threshold (operation 1508). If the process determines that the level does not exceed the threshold, the process terminates.

If the process determines that the level exceeds the threshold at operation 1508, the process requests a second copy of the image to be presented when the size of the copy is increased beyond the threshold (operation 1510). The second copy of the image has a higher resolution than the first copy of the image. Of course, in some advantageous embodiments, the threshold may be stored in the layout on a per-image or per-level basis. In other advantageous embodiments, the layout may not contain an identifier for a second copy of the image. In such advantageous embodiments, the process may instead request an image containing an error message or another suitable image.

The process then presents the second copy at the size requested by the user and in the location of the first copy (operation 1512). The process terminates thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits or field programmable gate arrays that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. For example, encryption may be done concurrently or in an order different from the order depicted in the figures. Also, other blocks may be added in addition to the illustrated blocks in a flowchart or block diagram.

Figure 16:
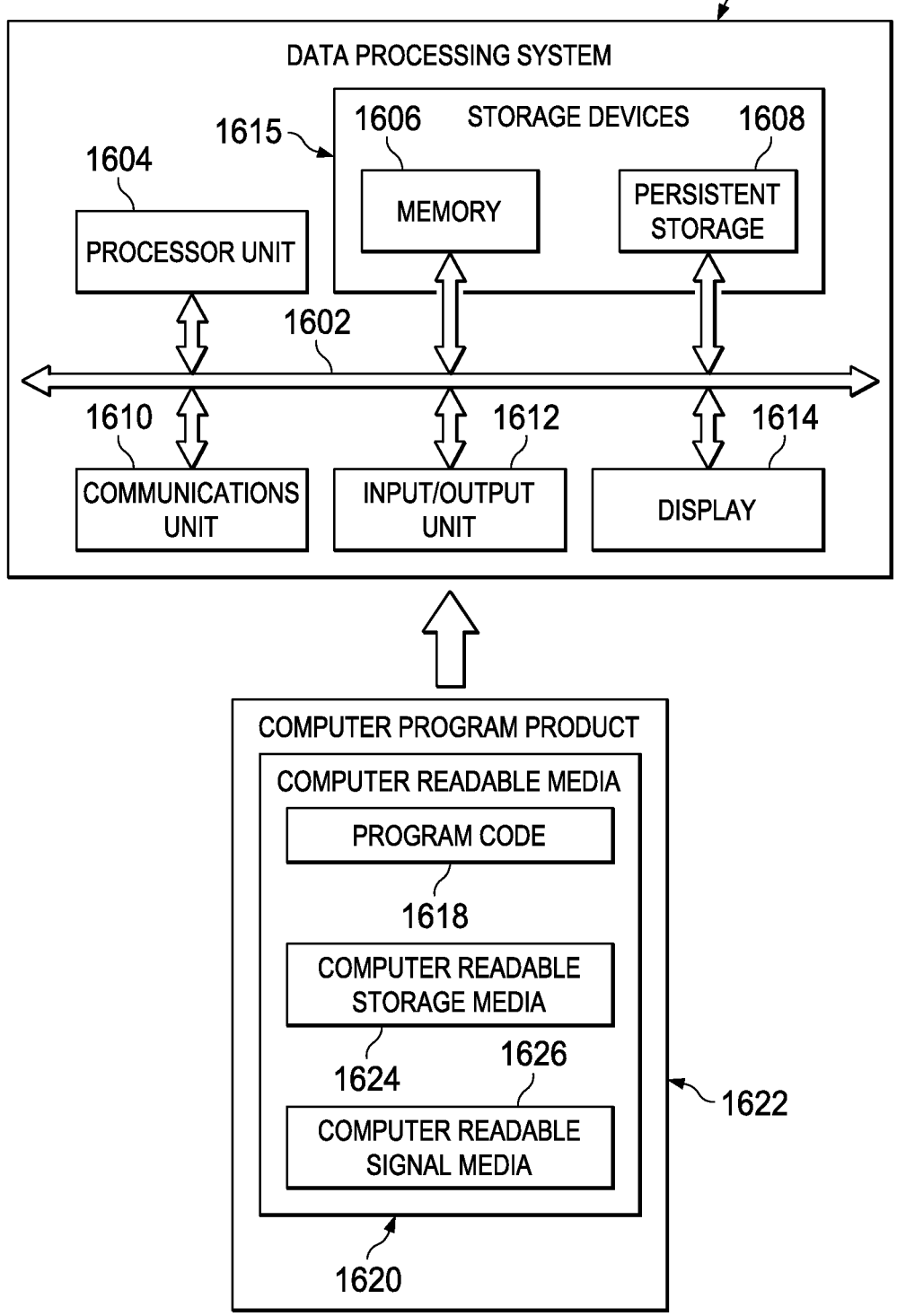
FIG. 16 is an illustration of a data processing system in accordance with an advantageous embodiment.

Turning now to FIG. 16, an illustration of a data processing system is depicted in accordance with an advantageous embodiment. Data processing system 1600 is an example of data processing system 302 and/or data processing system 304 in FIG. 3.

In this illustrative example, data processing system 1600 includes communications fabric 1602, which provides communications between processor unit 1604, memory 1606, persistent storage 1608, communications unit 1610, input/output (I/O) unit 1612, and display 1614.

Processor unit 1604 serves to execute instructions for software that may be loaded into memory 1606. Processor unit 1604 may be a number of processors, a multi-processor core, or some other type of processor, depending on the particular implementation. A "number", as used herein with reference to an item, means "one or more items." For example, a number of processors means one or more processors. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1615. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 may also be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different advantageous embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different advantageous embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626. Computer readable storage media 1624 may include, for example, an optical or magnetic disk that is inserted or placed into a drive or other device that is part of persistent storage 1608 for transfer onto a storage device, such as a hard drive, that is part of persistent storage 1608.

Computer readable storage media 1624 may also take the form of a persistent storage, such as a hard drive, a thumb drive, or a flash memory, that is connected to data processing system 1600. In some instances, computer readable storage media 1624 may not be removable from data processing system 1600. In these examples, computer readable storage media 1624 is a physical or tangible storage device used to store program code 1618, rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal.

In some advantageous embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different advantageous embodiments may be implemented in a data processing system, including components in addition to or in place of those illustrated for data processing system 1600. Other components shown in FIG. 16 can be varied from the illustrative examples shown.

Thus, the different advantageous embodiments allow a user to view and visually search a large number of images and/or documents simultaneously while using less bandwidth than transferring all of the images over a network. Since the user generally has an idea of an overall appearance of the image or images for which the user is searching, the user can use the layout and the lower resolution images to find images and/or documents of interest. The user may then zoom in on the documents and/or images to request a copy that has a sufficient resolution to interpret the information in the image. The user may view and navigate information on the display as though the images were laid out in the physical world without the physical space requirement involved with large collections of documents and/or images.

Thus, the different advantageous embodiments provide a method, an apparatus, and a computer program product for managing a number of images. In one advantageous embodiment, a method for managing a number of images is provided. A plurality of resolutions in which the number of images are to be stored and a style of presentation for the number of images is identified using a policy. A plurality of copies of the number of images in the plurality of resolutions are stored. A copy of a particular image in the number of images for a selected location in a layout defining a presentation for the number of images is selected using the style of presentation. The copy of the particular image has a desired resolution in the plurality of resolutions for the selected location in the layout.

The different advantageous embodiments can take the form of an entirely hardware embodiment, an entirely software embodiment, or an advantageous embodiment containing both hardware and software elements. Some advantageous embodiments are implemented in software, which includes, but is not limited to, forms, such as, for example, firmware, resident software, and microcode.

Furthermore, the different advantageous embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

Further still, additional advantageous embodiments can include a method and process to convert authored document pages of airplane support information into graphic tiles at multiple resolutions and then assemble and display them as a composite graphic.

Multiple image tiles are arranged into a composite graphic based on metadata stored for each graphic tile page and business rules that define, for example, which tiles will be shown and which are filtered out, what proximity each tile will have to the other tiles (x and y axis), and the relative size and resolution of each tile (z axis).

Many possible composite layouts can be assembled and displayed based on specific relationships between the tiled images and business process they support. For example: Part assembly breakdown—high level assembly, to lower level assemblies, to detail parts; Trouble shooting support information flow—fault reporting, to fault isolation, to part removal instruction images, to part interchangeability images; Wiring run visualization across multiple document pages; Engineering drawings arranged as they logically fit within a drawing tree hierarchy with simultaneous visibility of a drawing and its next higher assembly drawing and next lower children drawings.

Figure 17:
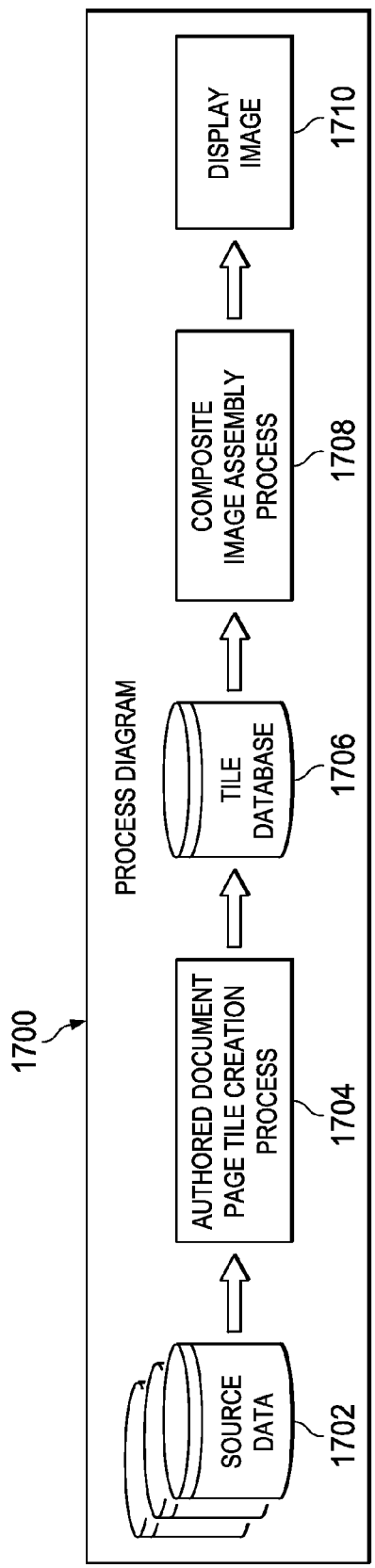
FIG. 17 is an illustration of a data processing system in accordance with an advantageous embodiment.

Turning now to FIG. 17, an illustration of a data processing diagram is depicted in accordance with an advantageous embodiment. Process Diagram 1700 is an example of data processing system 302 and/or data processing system 304 in FIG. 3.

The process diagram of FIG. 17 begins with obtaining source data from multiple existing data sources and formats (operation 1702). Source data comes from multiple documentation types. For example, the data can be in the form of images, text pages, wiring diagrams, or engineering drawings.

The process then generates tile images of each page and image each at multiple resolutions (operation 1704). Tile images are generated from each page or image from one or multiple data sources and formats. Metadata about the content of the data on each tile, its document and its source are recorded. Multiple resolutions of each tile image are generated to reduce the size of the composite image when assembled in a later process step and to speed transmission.

The process then stores a hierarchy of each tile image at multiple resolutions for rapid retrieval (operation 1706). Multiple copies of each tile image are stored in a hierarchy in a database to facilitate rapid retrieval.

The process next uses rules for extract and assembles the tiles into a composite image based on relationships at requested resolution (operation 1708). Extract and assembly of the tiles into a composite image are parts of this process. Many different spatial arrangements of the tiles are managed by rules here. The rules dictate the relative size of each tile to one another and where they are located in relation to each other. The location relationship of each tile is influenced by the content of the information, based on the metadata, and business rules defining location.

The process then displays the composite image within a browser or application (operation 1710). The composite image is displayed in an internet browser or within a software application. Display software controls image pan, zoom, rollover and selection actions of the user. These actions trigger the composite image to actively interchange higher resolution tiles with lower resolution versions of the same tiles as the user zooms and pans to particular areas of the composite image.

An additional advantageous embodiment would include a computer system or apparatus including a data prep computer, a web server or local storage device, a network wire or a local computer, and a composite image layout and display device. The data prep computer runs tile creation processes thereupon, and extracts the image tiles from the multiple source data documents and sends them to the tile graphic database. The web server or local storage device stores the tile database. The tile image data is then transmitted from the tile database to the composite image creation process via either a physical computer or using a computer network or the internet. The composite image layout and display device processes the tiled images into the composite image for display to the user, thereby allowing the user to perform various actions. For example, the user could open a full composite image or zoom in and out to an arbitrary page of a document at variable resolutions, as desired. Additionally, a user could see all or specifically identified other pages of the composite image, pan between all the images, select an image or images, highlight an image or images, and rearrange and/or reassemble the composite image, any sub-images or tiled or sub-tiled images, all via the display device.

One advantageous embodiment comprises tiling at multiple arbitrary resolutions of authored pages, and the laying out of tiles. The tiling at multiple arbitrary resolutions of authored pages includes reassembling of tiles for display based on custom filtering and arranged for display based on specific logical relationships between the content of the graphics; zoom levels, where each tile is stored in multiple resolutions to allow large numbers of images to be displayed within one page with increased detail as the user zooms into a particular tile; and linking identified in the source data is also used to set physical proximity between image tiles in composite image. The layout of tiles includes the layout being based on page content, such as parent/child drawings, pages being related spatially to one another based on their content (x axis and y axis), and pages being related in depth and detail by the z axis.

An additional advantageous embodiment of composite image layouts may be directed toward specific business applications. For instance, tiles arranged by relationship to one another, i.e. tiles arranged top to bottom as airplane sections and large complex assemblies break down to lower and lower assemblies all the way to individual parts. Another example is wiring schematics pages tiles arranged end to end to illustrate a complete wiring run. Additionally, engineering drawings tiles arranged top down in a hierarchy of the drawing tree. Also, fault isolation procedures tiled down to removal procedures for likely part removals tiled down to illustrated parts catalogue pages or wiring diagrams for electrical checks. Further examples include, page tiles arranged by reference links where all the linked documents are tiled below the page in view and page tiles arranged by order edited over time.

The advantageous embodiments discussed above, particularly those including software, make it easy to locate applicable aircraft technical support data visually. A mechanic will pan and zoom through a matrix of tiled 2D illustrations much as someone might flip through a book or scroll through microfilm looking for an illustration that matches. However, the data is extracted from multiple electronic databases and can be sorted and filtered according to the specific information. Typical digital documentation systems rely upon digital table of contents hierarchy that users must navigate up and down looking for applicable information. These methods work if the user knows the specific location within the tree or is able to provide a relevant keyword; however, these methods are ineffective when browsing for information within a very large information set. The user can reduce the number of graphics in the graphic matrix by entering filter information for a topic, location or data source for example: show only graphics of "pumps" in the "aircraft wheel well" from the "parts catalog." These filters can be set by a combination of predefined pick lists and use entered search criteria.

When a user identifies an illustration that looks like it could be associated with content that they need, they will roll the cursor over the graphic to see a summary of the documentation the graphic originated from. This allows the user to know more about the source of the graphic without actually opening the document. This saves time loading and opening another document particularly over slower Internet connections.

Selecting/clicking on the graphic opens the detailed original document that the graphic is from allowing the user to investigate further and then use the data. This disclosure is different because it includes building a customized assembly drawing set on the fly as opposed to tiling a set of graphics from a static data set. It is a collection of 2D line drawings for aircraft maintenance. The data sets that supply the content for the application are dynamic and constantly changing—this system will draw the updated graphics from each source data system.

The description of the different advantageous embodiments has been presented for purposes of illustration and description and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various embodiments with various modifications as are suited to the particular use contemplated.

What is claimed is:

1. A method for displaying desired information about an aircraft component from a plurality of image tiles by managing the plurality of image tiles on a display device in communication with a processor, the method comprising:

identifying, by a processor, a plurality of resolutions in which the plurality of image tiles are to be stored and a style of presentation for the plurality of image tiles using a policy, wherein the plurality of image tiles all relate to the aircraft component, wherein some of the plurality of image tiles are on different types of media, wherein desired information about the aircraft component is contained in the plurality of image tiles, wherein the desired information is too extensive to fit onto a single image tile, and wherein review of all of the image tiles would be undesirably time consuming;

storing, in a non-transitory computer readable storage medium, a plurality of copies of the plurality of image tiles in the plurality of resolutions, wherein any given image tile is stored as multiple copies in different resolutions;

selecting, by the processor, a copy of a particular image tile in the plurality of image tiles for a selected location in a layout defining a presentation for the plurality of image tiles using the style of presentation, wherein the copy of the particular image tile has a desired resolution in the plurality of resolutions, the desired resolution being selected according to the selected location in the layout, and the desired resolution further being selected, according to the policy, as being a higher relevance to the desired information about the aircraft component relative to information stored in remaining ones of the plurality of image tiles;

selecting, by the processor, a second copy of a second particular image tile in the plurality of image tiles for a second selected location in the layout, the second particular image tile having a second resolution less than the desired resolution for the copy of the particular image tile, the second copy of the second particular image tile also relating to the aircraft component; and displaying, on a display device in communication with the processor, the layout, wherein the layout includes both the copy of the particular image tile and the second copy of the second particular image tile, wherein displaying includes adjusting the layout to present the copy of the particular tile image at the desired resolution and in the selected location and also to present the second copy of the second image tile at the second location at the second resolution, and whereby faster review of all of the tile images is facilitated relative to reviewing each of the plurality of tiles individually.

2. The method of claim 1, wherein the style of presentation is a hierarchy in which the particular image tile on a first level of the hierarchy comprises additional detail about a second image tile on a second level of the hierarchy, wherein the second level is higher than the first level in the hierarchy, wherein the first hierarchy is laid out as a first row of image tiles, wherein the second hierarchy is laid out as a second row of image tiles, and wherein the first row is displayed below the second row.

3. The method of claim 2 wherein the style of presentation is a grid in which the plurality of image tiles are ordered according to a physical location of an object depicted in the plurality of image tiles.

4. The method of claim 3, further comprising:
receiving an additional user selection of an area of the display device that includes both the first row and the second row, the area being less than all image tiles initially shown on the display device;
further adjusting the display device to show only a second plurality of image tiles in the area; and
further adjusting the display device to increase resolution of the second plurality of image tiles by replacing initial image tiles initially displayed with copies of the second plurality of image tiles that have higher resolutions relative to the initial image tiles.

5. The method of claim 1, wherein the style of presentation comprises the selected location and a relative size for the particular image tile in the plurality of image tiles as compared to a second image tile in the plurality of image tiles and wherein the method further comprises:
prior to selecting the copy of the particular image tile in the plurality of image tiles for the selected location in the layout, selecting the desired resolution for the particular image tile based on the relative size of the particular image tile in the style of presentation.

6. The method of claim 1, wherein metadata is associated with the particular image tile in the plurality of image tiles, and further comprising:
selecting the selected location and the desired resolution for the particular image tile based on the metadata associated with the particular image tile.

7. The method of claim 6, wherein the metadata associated with the particular image tile comprises a plurality of coordinates for the selected location.

8. The method of claim 6, wherein the metadata associated with the particular image tile comprises a relative location for the particular image tile as compared to an image tile in the plurality of image tiles.

9. The method of claim 6, wherein the metadata associated with the particular image tile comprises information about at least one of a physical area and a level of detail of an object depicted by the particular image tile.

10. The method of claim 1, wherein a logical relationship is present between the selected location for the particular image tile and a plurality of selected locations for other image tiles in the plurality of image tiles and is based on a content of the particular image tile and the other image tiles.

11. The method of claim 10 further comprising:
selecting a size for the particular image tile in the layout based on the logical relationship.

12. The method of claim 10 further comprising:
identifying the logical relationship between the selected location and the plurality of selected locations using metadata associated with the particular image tile.

13. The method of claim 11, wherein the layout comprises an identifier for the copy of the particular image tile having the desired resolution, the selected location at which to present the copy of the particular image tile relative to the other image tiles in the plurality of image tiles, and the size at which to present the copy of the particular image tile relative to copies of the other image tiles in the plurality of image tiles.

14. The method of claim 1 further comprising:
responsive to a request for the layout from a requester, forming a computer program product containing the layout.

15. The method of claim 14 further comprising:
sending the computer program product, including the layout, to the requester.

16. The method of claim 14 further comprising:
receiving the computer program product, including the layout;
requesting the copy of the particular image tile having the desired resolution using an identifier; and
presenting the copy of the particular image tile at the selected location and a size received in the layout.

17. The method of claim 16, wherein the copy is a first copy, the desired resolution is a first desired resolution, and further comprising:
receiving a request to increase the size of the copy of the particular image tile in a view to a first level;
determining whether the first level exceeds a threshold;
responsive to a determination that the first level exceeds the threshold, requesting a second copy of the particular image tile having a second desired resolution, wherein the second copy of the particular image tile comprises a greater level of detail than the first copy of the particular image tile; and
presenting the second copy of the particular image tile such that the second copy is displayed in place of the first copy.

18. The method of claim 17, wherein the request is a first request and further comprising:
receiving a second request to decrease the size of the copy of the particular image tile in the view to a second level;
determining whether the second level is below the threshold; and
responsive to a determination that the second level is below the threshold, presenting the first copy of the particular image tile such that the first copy is displayed in place of the second copy.

19. A method for presenting a layout of a plurality of image tiles comprising:
receiving, at a processor, the layout of the plurality of image tiles comprising an identifier for a copy of a particular image tile in the plurality of image tiles having a desired resolution, a selected location at which to present the copy of the particular image tile relative to other image tiles in the plurality of image tiles, and a size at which to present the copy of the particular image tile relative to copies of the other image tiles in the plurality of image tiles, wherein the plurality of image tiles all relate to the aircraft component, wherein some of the plurality of image tiles are on different types of media, wherein desired information about the aircraft component is contained in the plurality of image tiles, wherein the desired information is too extensive to fit onto a single image tile, and wherein review of all of the image tiles would be undesirably time consuming;
requesting, by the processor, the copy of the particular image tile having the desired resolution using the identifier;
presenting, by the processor on a display device, the copy of the particular image tile at the selected location and the size received in the layout, wherein presenting includes adjusting the layout to present the copy of the particular tile image at the desired resolution and in the selected location, and wherein the desired resolution is selected according to the selected location; and
presenting, by the processor on the display device, a second copy of a second particular image tile at a second selected location and the size received in the layout, wherein presenting the second copy includes adjusting the layout to present the second copy of the second particular tile image at a second desired resolution and in a second selected location, wherein second desired resolution is selected according to the second selected location, wherein the second desired resolution is higher than the first desired resolution, and wherein both the copy of the particular image tile and the second copy of the particular image tile are logically related by both showing different images of a same aircraft component.

20. The method of claim 19, wherein the copy is a first copy, the desired resolution is a first desired resolution, and further comprising:
receiving a request to increase the size of the copy of the particular image tile in a view to a first level;
determining whether the first level exceeds a threshold;
responsive to a determination that the first level exceeds the threshold, requesting a third copy of the particular image tile having a third desired resolution, wherein the third copy of the particular image tile comprises a greater level of detail than the first copy of the particular image tile and the second copy; and
presenting the third copy of the particular image tile such that the third copy is displayed in place of the first copy.

21. The method of claim 20, wherein the request is a first request and further comprising:
receiving a second request to decrease the size of the copy of the particular image tile in the view to a second level;
determining whether the second level is below the threshold; and
responsive to a determination that the second level is below the threshold, presenting the first copy of the particular image tile in place of the second copy of the particular image tile.

22. The method of claim 21, wherein the copy of the particular image tile is the first copy and the selected location is a first selected location, and wherein presenting the copy of the particular image tile at the selected location and the size received in the layout comprises:
presenting the first copy of the particular image tile at the selected location and the size using a display device; and
moving a first image tile displayed on the display device such that the second copy of a second image tile received in the layout is presented using the display device.

23. The method of claim 22 further comprising:
determining whether the second copy of the second image tile is being presented using a particular region of the display device; and
responsive to a determination that the second copy of the second image tile is being presented using the particular region of the display device, requesting a third copy of the second image tile having a third desired resolution.

24. The method of claim 19, wherein the selected location is a first selected location and further comprising:
responsive to receiving a user input, presenting the copy of the particular image tile in a location relative to the other image tiles in the plurality of image tiles.

25. The method of claim 19, wherein the selected location of the copy of the particular image tile has a logical relationship with a plurality of selected locations of the copies of the other image tiles.

26. The method of claim 25, wherein the particular image tile depicts an assembly having a plurality of components, and the other image tiles depict the plurality of components.

27. The method of claim 25, wherein the particular image tile depicts a first portion of a wiring system and the other image tiles depict other portions of the wiring system, wherein the first portion comprises a first plurality of wires that connects to a second plurality of wires in at least one portion in the other portions.

28. The method of claim 25, wherein the selected location for the particular image tile is a point in a second image tile at which a reference to a document is located, and wherein the particular image tile is the document.

29. The method of claim 19 further comprising:
receiving a user input comprising an activation of the copy of the particular image tile; and
responsive to receiving the user input, presenting the copy of the particular image tile with a color highlight.

30. A computer program product displaying desired information about an aircraft component from a plurality of image tiles by managing the plurality of image tiles on a display device in communication with a processor, the computer program product comprising:
a non-transitory computer recordable storage medium;
program code, stored on the non-transitory computer recordable storage medium, for identifying a plurality of resolutions in which the plurality of image tiles are to be stored and a style of presentation for the plurality of image tiles using a policy, wherein the plurality of image tiles all relate to the aircraft component, wherein some of the plurality of image tiles are on different types of media, wherein desired information about the aircraft component is contained in the plurality of image tiles, wherein the desired information is too extensive to fit onto a single image tile, and wherein review of all of the image tiles would be undesirably time consuming;
program code, stored on the non-transitory computer recordable storage medium, for storing a plurality of copies of the plurality of image tiles in the plurality of resolutions, wherein any given image tile is stored as multiple copies in different resolutions;
program code, stored on the non-transitory computer recordable storage medium, for selecting a copy of a particular image tile in the plurality of image tiles for a selected location in a layout defining a presentation for the plurality of image tiles using the style of presentation, wherein the copy for the particular image tile has a desired resolution in the plurality of resolutions for the selected location in the layout, and the desired resolution further being selected, according to the policy, as being a higher relevance to the desired information about the aircraft component relative to information stored in remaining ones of the plurality of image tiles; and
selecting, by the processor, a second copy of a second particular image tile in the plurality of image tiles for a second selected location in the layout, the second particular image tile having a second resolution less than the desired resolution for the copy of the particular image tile, the second copy of the second particular image tile also relating to the aircraft component; and
program code for displaying, on a display device in communication with the processor, the layout, wherein the layout includes both the copy of the particular image tile and the second copy of the second particular image tile, wherein the program code for displaying includes program code for adjusting the layout to present the copy of the particular tile image at the desired resolution and in the selected location, and wherein the program code for displaying is configured such that the desired resolution is selected according to the selected location and also to present the second copy of the second image tile at the second location at the second resolution, and whereby faster review of all of the tile images is facilitated relative to reviewing each of the plurality of tiles individually.

31. A computer program product for presenting a layout of a plurality of image tiles comprising:
a non-transitory computer recordable storage medium;
program code, stored on the non-transitory computer recordable storage medium, for receiving the layout of the plurality of image tiles comprising an identifier for a copy of a particular image tile in the plurality of image tiles having a desired resolution, a selected location at which to present the copy of the particular image tile relative to other image tiles in the plurality of image tiles, and a size at which to present the copy of the particular image tile relative to copies of the other image tiles in the plurality of image tiles, wherein the plurality of image tiles all relate to the aircraft component, wherein some of the plurality of image tiles are on different types of media, wherein desired information about the aircraft component is contained in the plurality of image tiles, wherein the desired information is too extensive to fit onto a single image tile, and wherein review of all of the image tiles would be undesirably time consuming;
program code, stored on the computer recordable storage medium, for requesting the copy of the particular image tile having the desired resolution using the identifier;
program code, stored on the non-transitory computer recordable storage medium, for presenting the copy of the particular image tile at the selected location and the size received in the layout, wherein the program code for presenting includes program code for adjusting the layout to present the copy of the particular tile image at the desired resolution and in the selected location, and wherein the program code for presenting is configured such that the desired resolution is selected according to the selected location; and
program code, stored on the non-transitory computer recordable storage medium, for presenting, by the processor on the display device, a second copy of a second particular image tile at a second selected location and the size received in the layout, wherein presenting the second copy includes adjusting the layout to present the second copy of the second particular tile image at a second desired resolution and in a second selected location, wherein second desired resolution is selected according to the second selected location, wherein the second desired resolution is higher than the first desired resolution, and wherein both the copy of the particular image tile and the second copy of the particular image tile are logically related by both showing different images of a same aircraft component.

32. An apparatus for managing a plurality of image tiles comprising:
a storage device containing program code; and
a processor unit configured to execute the program code to identify a plurality of resolutions in which the plurality of image tiles are to be stored and a style of presentation for the plurality of image tiles using a policy, wherein the plurality of image tiles all relate to the aircraft component, wherein some of the plurality of image tiles are on different types of media, wherein desired information about the aircraft component is contained in the plurality of image tiles, wherein the desired information is too extensive to fit onto a single image tile, and wherein review of all of the image tiles would be undesirably time consuming; store a plurality of copies of the plurality of image tiles in the plurality of resolutions, wherein any given image tile is stored as multiple copies in different resolutions; select a copy of a particular image tile in the plurality of image tiles for a selected location in a layout defining a presentation for the plurality of image tiles using the style of presentation, wherein the copy for the particular image tile has a desired resolution in the plurality of resolutions for the selected location in the layout, and the desired resolution further being selected, according to the policy, as being a higher relevance to the desired information about the aircraft component relative to information stored in remaining ones of the plurality of image tiles; selecting, by the processor, a second copy of a second particular image tile in the plurality of image tiles for a second selected location in the layout, the second particular image tile having a second resolution less than the desired resolution for the copy of the particular image tile, the second copy of the second particular image tile also relating to the aircraft component; and display, on a display device in communication with the processor, the layout, wherein the layout includes both the copy of the particular image tile and the second copy of the second particular image tile, including to adjust the layout to present the copy of the particular tile image at the desired resolution and in the selected location, wherein the processor unit is further configured such that desired resolution is selected according to the selected location and also to present the second copy of the second image tile at the second location at the second resolution, and whereby faster review of all of the tile images is facilitated relative to reviewing each of the plurality of tiles individually.

33. The apparatus of claim 32, wherein the style of presentation is a hierarchy in which the particular image tile on a first level of the hierarchy comprises additional detail about a second image tile on a second level of the hierarchy, wherein the second level is higher than the first level in the hierarchy.

34. The apparatus of claim 32, wherein the style of presentation is a grid in which the plurality of image tiles are ordered according to a physical location of an object depicted in the plurality of image tiles.

35. The apparatus of claim 32, wherein the style of presentation comprises the selected location and a relative size for the particular image tile in the plurality of image tiles as compared to a second image tile in the plurality of image tiles.

36. The apparatus of claim 35, wherein the processor unit is further configured to execute the program code to select the desired resolution for the particular image tile based on the relative size of the particular image tile in the style of presentation prior to selecting the copy of the particular image tile in the plurality of image tiles for the selected location in the layout.

37. The apparatus of claim 32, wherein metadata is associated with the particular image tile in the plurality of image tiles, and wherein the processor unit is further configured to execute the program code to select the selected location and the desired resolution for the particular image tile based on the metadata associated with the particular image tile.

38. The apparatus of claim 37, wherein the metadata associated with the particular image tile comprises a plurality of coordinates for the selected location.

39. The apparatus of claim 37, wherein the metadata associated with the particular image tile comprises a relative location for the particular image tile as compared to an image tile in the plurality of image tiles.

\* \* \* \* \*